(12) United States Patent
Liu et al.

(10) Patent No.: US 11,909,704 B2
(45) Date of Patent: *Feb. 20, 2024

(54) DEVICE, NETWORK, AND METHOD FOR COMMUNICATIONS WITH SPATIAL-SPECIFIC SENSING

(71) Applicant: Futurewei Technologies, Inc., Plano, TX (US)

(72) Inventors: Jialing Liu, Palatine, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/455,787

(22) Filed: Nov. 19, 2021

(65) Prior Publication Data
US 2022/0078156 A1 Mar. 10, 2022

Related U.S. Application Data

(63) Continuation of application No. 15/809,603, filed on Nov. 10, 2017, now abandoned, which is a
(Continued)

(51) Int. Cl.
*H04L 51/234* (2022.01)
*H04W 4/14* (2009.01)
(Continued)

(52) U.S. Cl.
CPC ......... *H04L 51/234* (2022.05); *H04B 7/0634* (2013.01); *H04B 7/086* (2013.01);
(Continued)

(58) Field of Classification Search
CPC ....... H04L 51/234; H04L 51/23; H04L 51/58; H04L 51/48; H04B 7/0634; H04B 7/086; H04W 4/14; H04W 74/0808
See application file for complete search history.

(56) References Cited

U.S. PATENT DOCUMENTS 9,847,962 B2 * 12/2017 Liu ................... H04L 51/58
2007/0096982 A1 5/2007 Kalian et al.
(Continued)

FOREIGN PATENT DOCUMENTS

CN 1934555 A 3/2007
CN 101064558 A 10/2007
(Continued)

OTHER PUBLICATIONS

Alawieh, B., et al., "Improving the performance of power-aware multi-rate IEEE 802.11 in multihop wireless networks," www.ietdl.org, IET Communications, vol. 5, Issue 6, ISSN 1751-8628, Feb. 14, 2010; pp. 775-788, Jun. 2011.
(Continued)

*Primary Examiner* — Elton Williams
(74) *Attorney, Agent, or Firm* — Slater Matsil, LLP

(57) ABSTRACT

A device, a network, and a method for wireless communication are provided. In an embodiment, the method, performed by a first communication node, includes generating at least one of a spatial-specific receiving pattern and a first spatial-specific processing pattern, receiving a waveform signal from one or more second nodes in accordance with the at least one of the spatial-specific receiving pattern or the first spatial-specific processing pattern, determining a second spatial-specific processing pattern and a channel status of a channel, wherein the channel status of the channel is according to the at least one of the spatial-specific receiving pattern and the second spatial-specific processing pattern and transmitting a signal along a transmission direction, wherein the transmission direction is in accordance with the at least one of the spatial-specific receiving pattern and the second spatial-specific processing pattern.

20 Claims, 13 Drawing Sheets

Related U.S. Application Data continuation of application No. 14/810,299, filed on Jul. 27, 2015, now Pat. No. 9,847,962.

(60) Provisional application No. 62/030,457, filed on Jul. 29, 2014.

(51) Int. Cl.

| | | |
|---|---|---|
| *H04L 51/23* | (2022.01) | |
| *H04L 51/48* | (2022.01) | |
| *H04L 51/58* | (2022.01) | |
| *H04B 7/06* | (2006.01) | |
| *H04B 7/08* | (2006.01) | |
| *H04W 74/08* | (2009.01) | |

(52) U.S. Cl.
CPC .............. *H04L 51/23* (2022.05); *H04L 51/48* (2022.05); *H04L 51/58* (2022.05); *H04W 4/14* (2013.01); *H04W 74/0808* (2013.01)

(56) References Cited

U.S. PATENT DOCUMENTS

| | | |
|---|---|---|
| 2009/0043931 A1 | 2/2009 | Evoy et al. |
| 2009/0325482 A1 | 12/2009 | Zhou et al. |
| 2010/0118835 A1 | 5/2010 | Lakkis et al. |
| 2010/0172296 A1 | 7/2010 | Singh et al. |
| 2010/0177719 A1 | 7/2010 | Shao et al. |
| 2013/0028341 A1 | 1/2013 | Ayach et al. |
| 2013/0128839 A1 | 5/2013 | Shao et al. |
| 2013/0163705 A1 | 6/2013 | Stirland |
| 2013/0343303 A1 | 12/2013 | Kim et al. |
| 2014/0079098 A1 | 3/2014 | Harjani et al. |
| 2014/0334566 A1 | 11/2014 | Kim et al. |
| 2015/0131536 A1 | 5/2015 | Kaur et al. |

FOREIGN PATENT DOCUMENTS

| | | |
|---|---|---|
| CN | 102007709 A | 4/2011 |
| CN | 103370896 A | 10/2013 |

OTHER PUBLICATIONS

Alawieh, B. et al., "A distributed power and rate control scheme for mobile ad hoc networks," IEEE 6th International Symposium on Modeling and Optimization in Mobile, Ad hoc, and Wireless Networks and Workshops, 2008, WIOPT 2008, Apr. 1, 2008, pp. 335-343.

Choudhury, Romit Roy et al., "Using Directional Antennas for Medium Access Control in Ad Hoc Networks," Proceedings of the 8th Annual International Conference on Mobile Computing and Networking, Mobicom, Sep. 23-28, 2002, pp. 59-70.

Hadjadj-Aoul, Y. et al., "On Physical-Awareness Directional MAC Protocol for Indoor Wireless Networks," IEEE Global Telecommunications Conference: "GLOBECOM", ISBN: 978-1-4244-2324-8, Dec. 2008, pp. 1-5.

\* cited by examiner

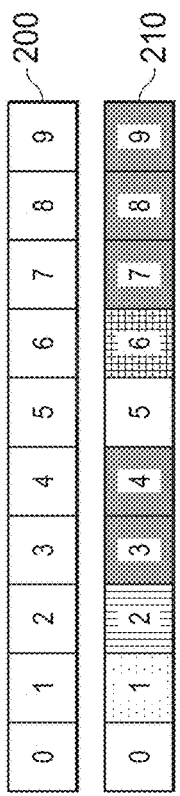
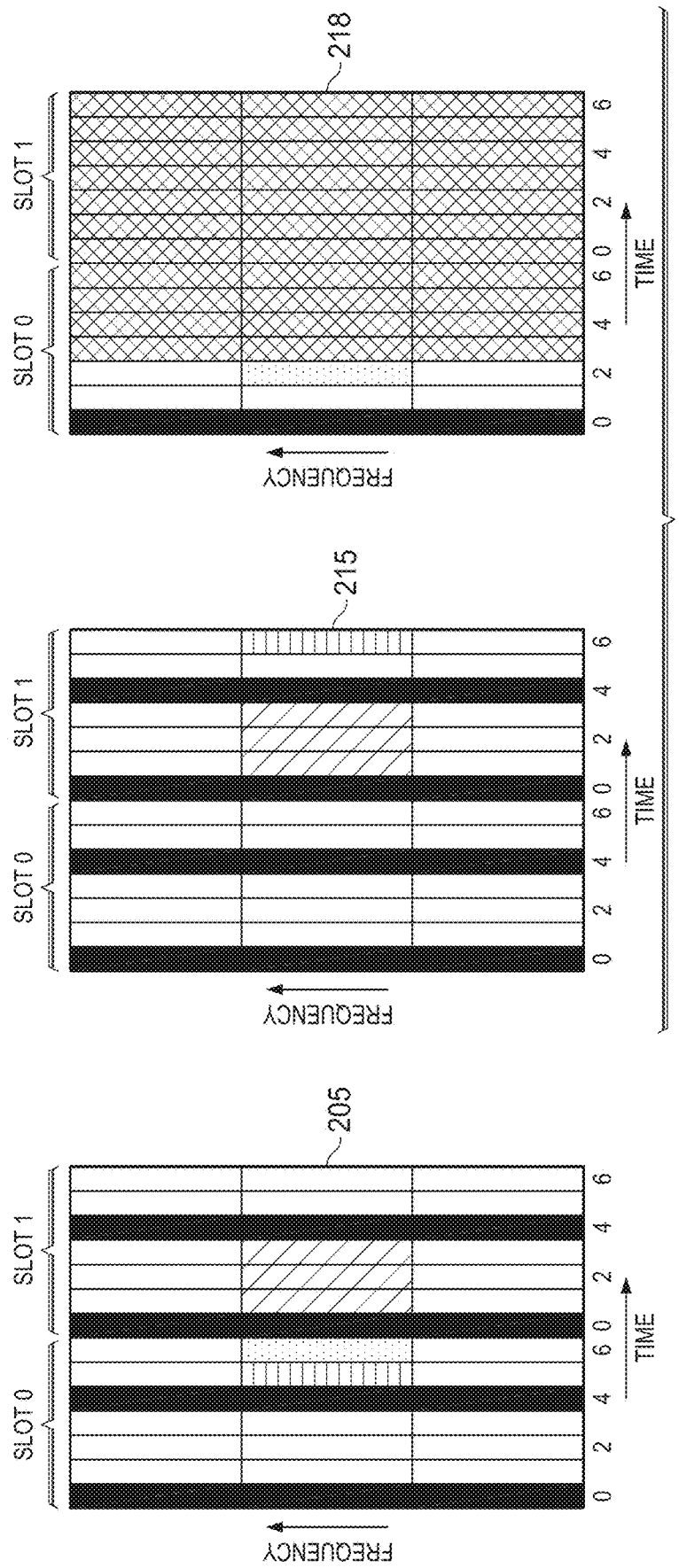
FIG. 2B
FIG. 2C
FIG. 2D

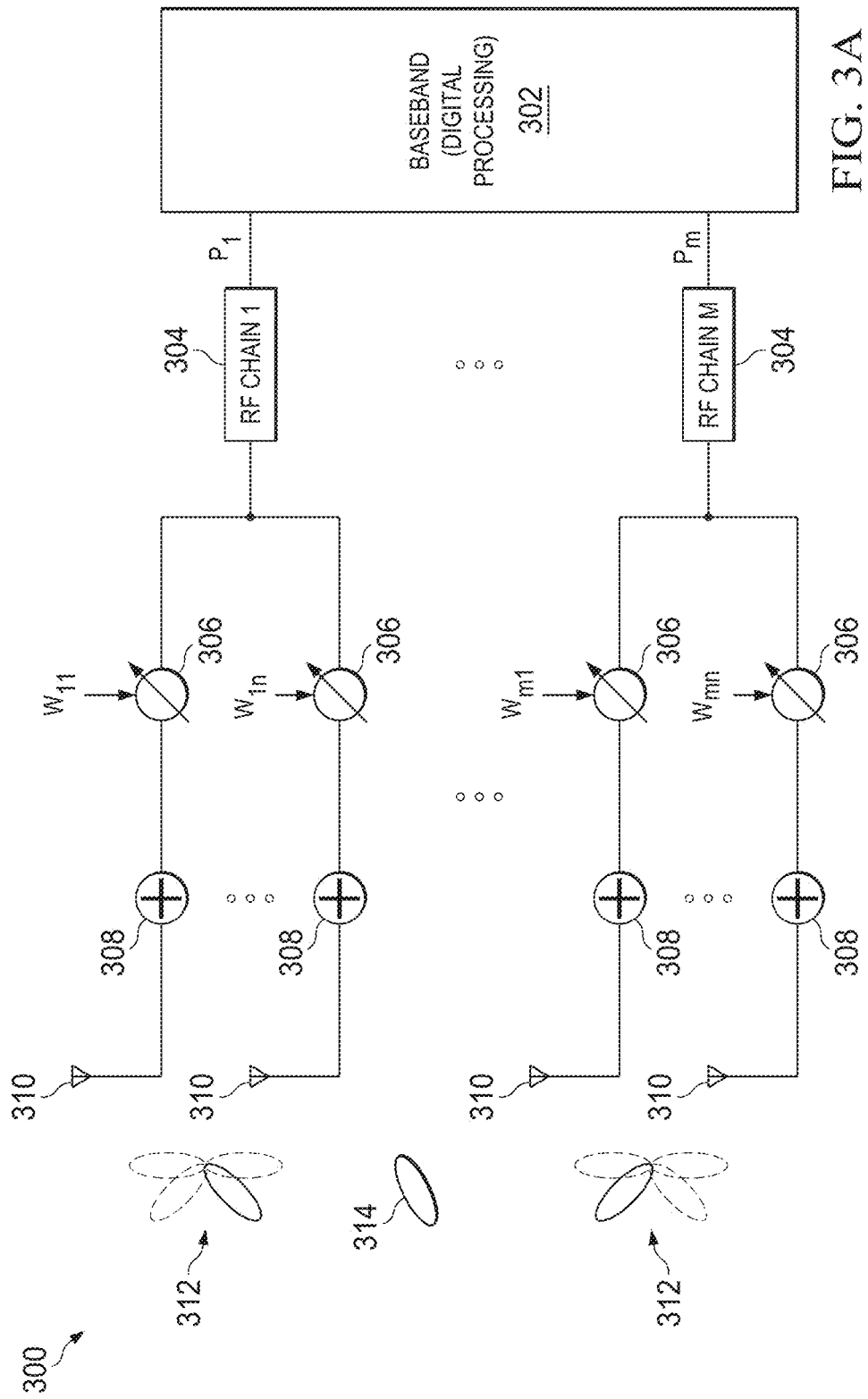

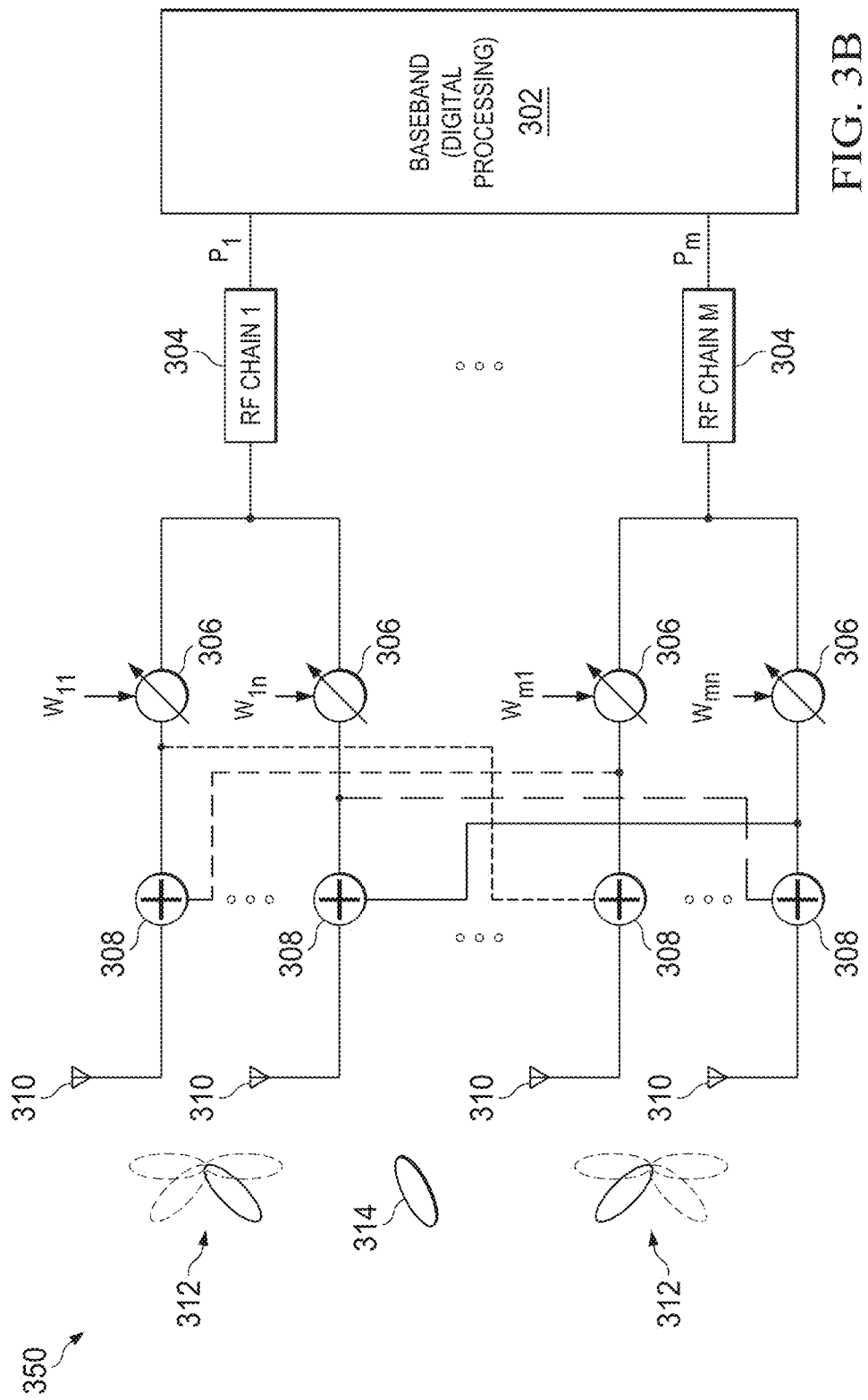

DEVICE, NETWORK, AND METHOD FOR COMMUNICATIONS WITH SPATIAL-SPECIFIC SENSING

This application is a continuation of U.S. patent application Ser. No. 15/809,603 entitled "Device, Network, and Method for Communications with Spatial-specific Sensing," filed Nov. 10, 2017, which is a continuation of U.S. patent application Ser. No. 14/810,299 entitled "Device, Network, and Method for Communications with Spatial-specific Sensing," filed Jul. 27, 2015, which claims the benefit of U.S. Provisional Patent Application No. 62/030,457 filed Jul. 29, 2014 and entitled "Device, Network, and Method for Communications with Spatial-specific Sensing," which applications are incorporated herein by reference in their entirety.

TECHNICAL FIELD

The present disclosure relates to a device, network, and method for wireless communications and, in particular embodiments, to a device, network, and method for communications with sensing in the spatial domain, i.e., directional sensing, or more generally, resource-specific sensing.

BACKGROUND

The amount of wireless data being transferred is expected to exceed that of wired data, pushing the limits of macro cellular deployment. Small cell deployment with higher density and/or with new and diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as spectrum resources in high-frequency bands operating in millimeter wave (mmWave) regime, unlicensed/shared-license spectrum resources, and the like.

SUMMARY

Various embodiments relate to devices, networks, and methods for communications with sensing in the spatial domain.

An embodiment method for providing contention-based transmission from a first communication node in a network to a second communication node includes determining, by the first communication node, a transmission direction, the transmission direction characterized by a digital beamforming direction and an analog beamsteering direction; performing, by the first communication node, spatial-specific carrier sensing in accordance with a sensing direction associated with the transmission direction; determining, by the first communication node, a channel status of a channel along the sensing direction according to the spatial-specific carrier sensing; and transmitting, by the first communication node, a signal along the transmission direction when the channel is not busy.

An embodiment first communication node for providing contention-based transmission from a first communication node in a network to a second communication node includes a processor and a non-transitory computer readable storage medium storing programming for execution by the processor, the programming including instructions to: determine a transmission direction, the transmission direction characterized by a digital beamforming direction and an analog beamsteering direction; perform spatial-specific carrier sensing in accordance with a sensing direction associated with the transmission direction; determine a channel status of a channel along the sensing direction according to the spatial-specific carrier sensing; and transmit a signal along the transmission direction when the channel is not busy.

BRIEF DESCRIPTION OF THE DRAWINGS

For a more complete understanding of the present invention, and the advantages thereof, reference is now made to the following descriptions taken in conjunction with the accompanying drawing, in which:

FIG. 2B illustrates an example frame structure for a frequency division duplexing (FDD) configuration and a time division duplexing (TDD) configuration;

FIG. 2C illustrates an example OFDM subframe for FDD configuration;

FIG. 2D illustrates an example OFDM subframe for TDD configuration;

FIGS. 3A and 3B are block diagrams of embodiments of systems 300, 350 for analog beamsteering;

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Typically, in a modern wireless communications system, such as a Third Generation Partnership Project (3GPP) Long Term Evolution (LTE) compliant communications system, a plurality of cells or evolved NodeBs (eNBs) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UEs), wireless devices, mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 1A:
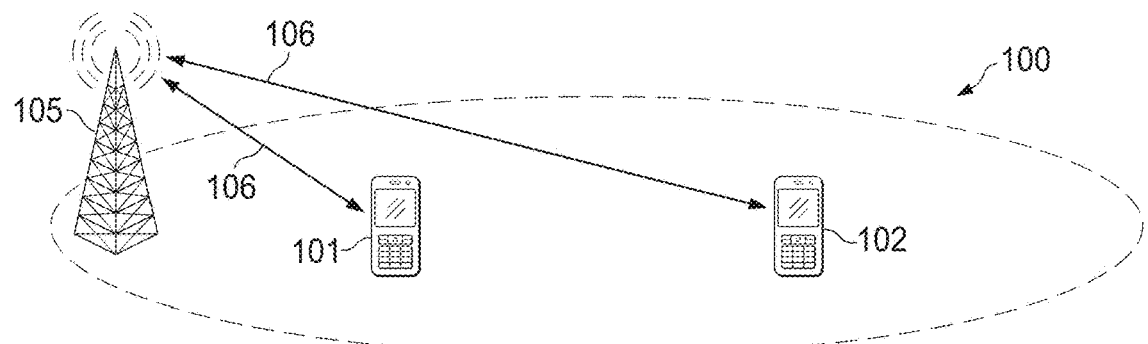
FIG. 1A illustrates cellular communications in a macro cell.

As shown in FIG. 1A, system 100 is a typical wireless network with a communications controller 105 communicating using a wireless link 106 to a first wireless device 101 and a second wireless device 102. The wireless link 106 can comprise a single carrier frequency such as used typically for a time division duplex (TDD) configuration or a pair of carrier frequencies as used in a frequency division duplex (FDD) configuration. Not shown in system 100 are some of the network elements used to support the communications controller 105 such as a backhaul, management entities, etc. The transmission/reception from controller to a UE is called downlink (DL) transmission/reception, and the transmission/reception from a UE to a controller is called uplink (UL) transmission/reception. The communication controller 105 may include an antenna, a transmitter, a receiver, a processor, and non-transitory computer readable storage and/or memory. The communication controller 105 may be implemented as or referred to as a transmission point (TP), BS, a base transceiver station (BTS), an AP, an eNB, a network controller, a controller, a base terminal station, and so on. These terms may be used interchangeably throughout this disclosure.

Figure 1B:
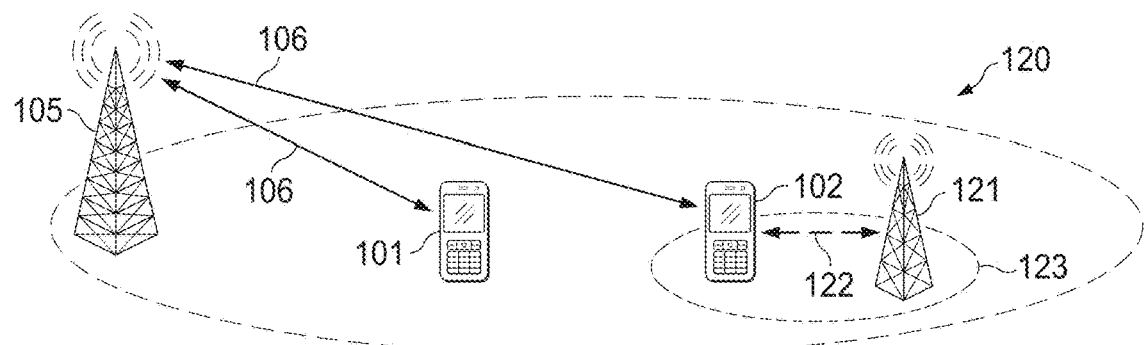
FIG. 1B illustrates cellular communications in a heterogeneous network with a macro cell and a pico cell.

As shown in FIG. 1B, system 120 is an example wireless heterogeneous network (HetNet) with communications controller 105 communicating to wireless device 101 using wireless link 106 (solid line) and to wireless device 102 using wireless link 106. A second communications controller 121, such as a pico cell, has a coverage area 123 and is capable of communicating to wireless device 102 using wireless link 122. Typically, wireless link 122 and wireless link 106 use the same carrier frequency, but wireless link 122 and wireless link 106 can use different frequencies.

There may be a backhaul (not shown) connecting communications controller 105 and communications controller 121. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces.

In a network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a network, the points configured for a UE for transmission or reception may include multiple points, some pairs of points may have fast backhaul, but some other pairs of points may have slow backhaul or any backhaul.

In a deployment, an eNodeB may control one or more cells. Multiple remote radio units may be connected to the same base band unit of the eNodeB by fiber cable, and the latency between base band unit and remote radio unit is quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of data transmitted in different cells for the UE can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
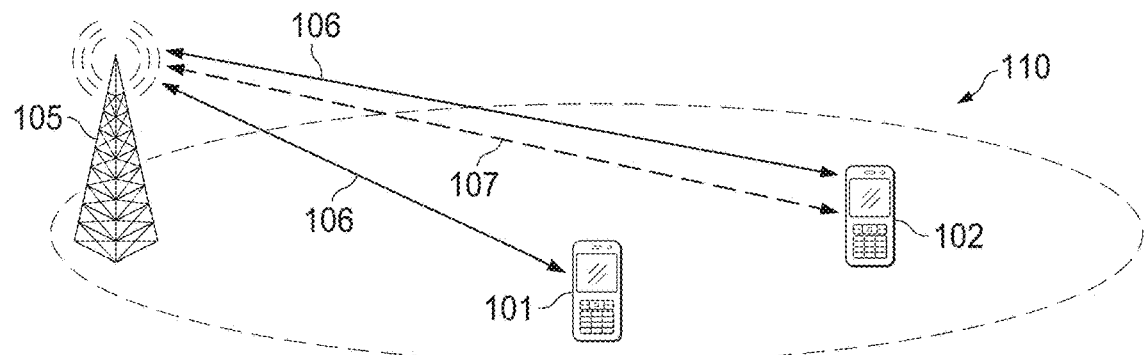
FIG. 1C illustrates cellular communications in a macro cell with carrier aggregation.

As shown in FIG. 1C, system 110 is a typical wireless network configured with carrier aggregation (CA) where communications controller 105 communicates to wireless device 101 using wireless link 106 (solid line) and to wireless device 102 using wireless link 107 (dashed line) and wireless link 106. In some example deployments, for wireless device 102, wireless link 106 can be called a primary component carrier (PCC) while wireless link 107 can be called a secondary component carrier (SCC). In some carrier aggregation deployments, the PCC can be provided feedback from a wireless device to a communications controller while the SCC can carry data traffic. In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With CA, one eNB may operate and control several component carriers forming primary cell (Pcell) and secondary cell (Scell). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 1D:
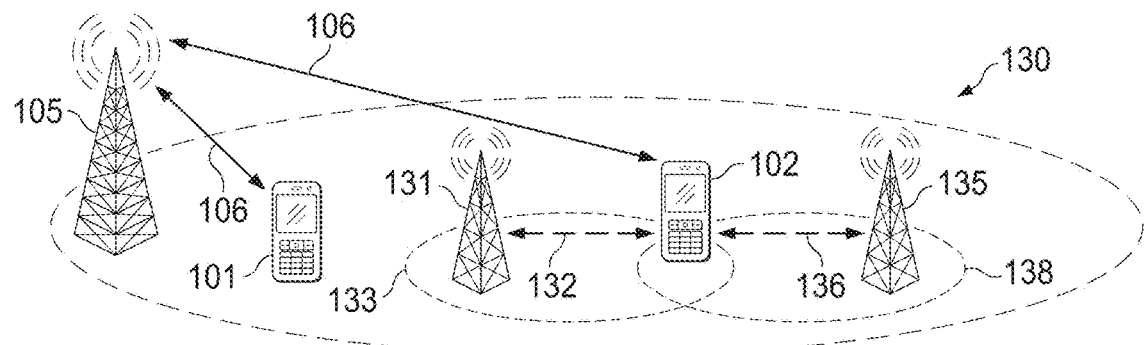
FIG. 1D illustrates cellular communications in a heterogeneous network with a macro cell and several small cells.

As shown in FIG. 1D, system 130 is an example wireless heterogeneous network with communications controller 105 communicating to wireless device 101 using wireless link 106 (solid line) and to wireless device 102 using wireless link 106. A second communications controller 131, such as a small cell, has a coverage area 133 and is capable of communicating to wireless device 102 using wireless link 132. A communications controller for another small cell 135 has coverage area 138 and uses wireless link 136. Communications controller 135 is capable of communicating to wireless device 102 using wireless link 136. Coverage areas 133 and 138 may overlap. The carrier frequencies for wireless links 106, 132, and 136 may be the same or may be different.

Figure 1E:
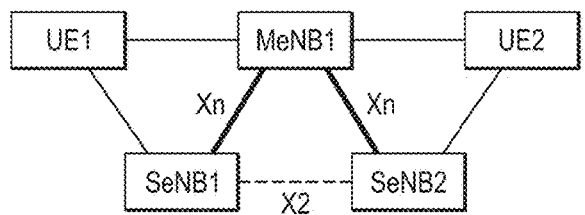
FIG. 1E illustrates an example dual connectivity scenario.

FIG. 1E shows an example system configured for dual connectivity. A master eNB (MeNB) is connected to one or more secondary eNBs (SeNBs) using an interface such as the Xn interface (Xn can be X2 in some specific cases). The backhaul can support this interface. Between the SeNBs, there may be an X2 interface. A UE, such as UE1, is connected wirelessly to MeNB1 and SeNB1. A second UE, UE2, can connect wirelessly to MeNB1 and SeNB2.

In orthogonal frequency-division multiplexing (OFDM) systems, the frequency bandwidth is divided into multiple subcarriers in frequency domain. In the time domain, one subframe is divided into multiple OFDM symbols. Each OFDM symbol may have a cyclic prefix to avoid the inter-symbol interference due to multiple path delays. One resource element (RE) is defined by the time-frequency resource within one subcarrier and one OFDM symbol. A reference signal and other signals, such as a data channel, e.g. physical downlink shared channel (PDSCH), and a control channel, e.g. physical downlink control channel (PDCCH), are orthogonal and multiplexed in different resource elements in time-frequency domain. Further, the signals are modulated and mapped into resource elements. For each OFDM symbol, the signals in the frequency domain are transformed into the signals in time domain using, e.g., Fourier transforms, and are transmitted with added cyclic prefix to avoid the inter-symbol interference.

Figure 2A:
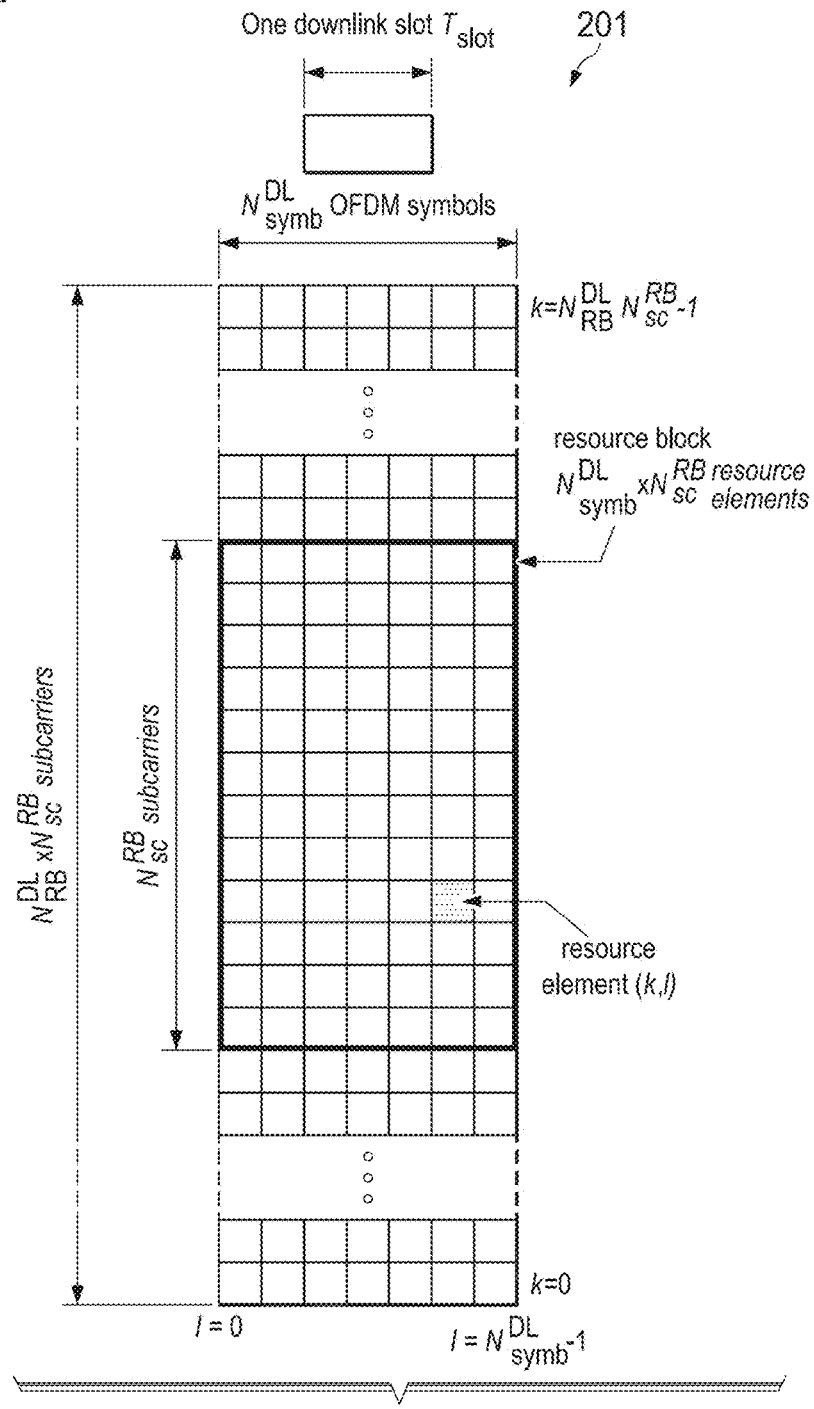
FIG. 2A illustrates example orthogonal frequency division multiplexing (OFDM) symbols with normal cyclic prefix (CP)

Each resource block (RB) contains a number of REs. FIG. 2A illustrates example OFDM symbols with normal cyclic prefix (CP). There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB, and hence in this example, there are 12×14=168 REs in an RB pair (an RB is 12 subcarriers by the number of symbols in a slot). In each subframe, there are a number of RBs, and the number may depend on the bandwidth (BW).

FIG. 2B shows two frame configurations used in LTE. Frame 200 is typically used for an FDD configuration, where all 10 subframes, labeled 0 through 9, communicate in the same direction (downlink in this example). Each subframe is 1 millisecond in duration and each frame is 10 milliseconds in duration. Frame 210 shows a TDD configuration where certain subframes are allocated for downlink transmissions (such as unshaded boxes (subframes 0 and 5), for uplink transmissions (vertical lines (subframe 2)), and special (dotted box (subframe 1)) which contain both uplink and downlink transmissions. An entire subframe dedicated for downlink (uplink) transmission can be called a downlink (uplink) subframe. Subframe 6 can be either a downlink or a special subframe depending on TDD configuration. Each of the solid shaded boxes (subframes 3, 4, 7, 8, and 9) can be either a downlink subframe or an uplink subframe depending on TDD configuration. The coloring used in frame 210 is exemplary but is based on the standards TSG 36.211 Rel. 11, which is hereby incorporated herein by reference.

FIG. 2C and FIG. 2D show examples of downlink subframes that are partitioned in terms of symbols and frequency. A subframe, such as subframe 205, is divided into 3 sections in the frequency domain (assuming the number of RBs is greater than 6). An analogous diagram can be shown for a 6 RBs downlink bandwidth (e.g., bandwidth of the downlink carrier).

In FIG. 2C, subframe 205 shows an example of the symbol allocation for an FDD configuration for subframes 0 and 5. The solid shading shows the symbols that have the common reference signal (CRS). The example assumes either CRS is transmitted on antenna port 0 or on antenna ports 0 and 1. The horizontal shading shows the location of the secondary synchronization signal (SSS). The dotted shading shows the location of the primary synchronization signal (PSS). Both the PSS and SSS occupy the center six resource blocks of the downlink carrier. The diagonal lines in symbols 0, 1, 2, 3 of slot 1 represent the location where the physical broadcast channel (PBCH) occupies for subframe 0. The PBCH is not transmitted in subframe 5 in Rel. 11 of the standards. Note, the PSS, SSS, and CRS can be viewed as overhead.

In FIG. 2D, subframe 215 shows an example of the symbol allocation for subframes 0 and 5 of TDD subframe 210 in FIG. 2B. Likewise, subframe 218 shows an example of the symbol allocation for subframes 1 and 6 of TDD subframe 210. In both subframe 215 and subframe 218, the solid shading shows the symbols having the CRS. The example also assumes either CRS is transmitted on antenna port 0 or on antenna ports 0 and 1. The horizontal shading in subframe 215 shows the location of the SSS. The dotted shading in subframe 218 shows the location of the PSS. Both the PSS and SSS occupy the center six RBs of the downlink carrier. The cross shading in subframe 218 indicates that the remaining symbols of the subframe are either downlink (if subframe 6 is a downlink subframe) or a combination of downlink symbols, guard time, and uplink symbols if the subframe is a special subframe. Similar to FIG. 2C, the diagonal lines in symbols 0, 1, 2, 3 of slot 1 represent the location where the PBCH occupies for subframe 0. The PBCH is not transmitted in subframe 5 in Rel. 11 of the standards. Note, the PSS, SSS, and CRS can be viewed as overhead. The information contents of the PBCH (i.e., master information block) can change every 40 ms.

Figure 2E:
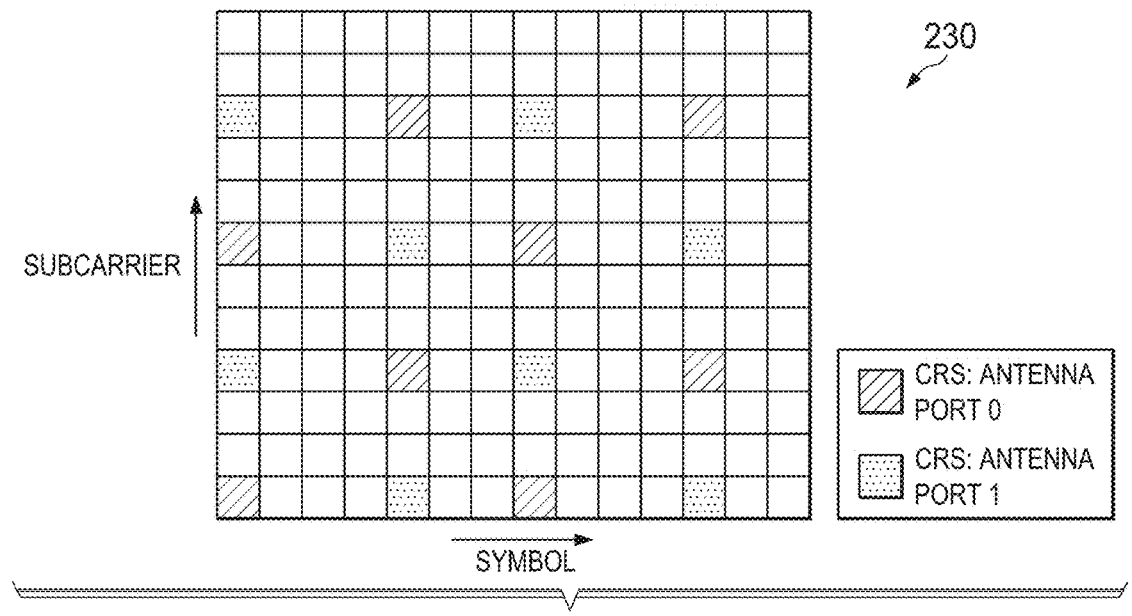
FIG. 2E illustrates an example common reference signal (CRS)

In downlink transmission of LTE-A system, there is reference signal for UE to perform channel estimation for demodulation of PDCCH and other common channels as well as for measurement and some feedbacks, which is CRS inherited from the Rel-8/9 specification of E-UTRA, as shown in FIG. 2E. Dedicated/de-modulation reference signal (DMRS) can be transmitted together with the PDSCH channel in Rel-10 of E-UTRA. DMRS is used for channel estimation during PDSCH demodulation. DMRS can also be transmitted together with the enhanced PDCCH (EPDCCH)

for the channel estimation of EPDCCH by the UE. The notation (E)PDCCH indicates EPDCCH and/or PDCCH.

Figure 2F:
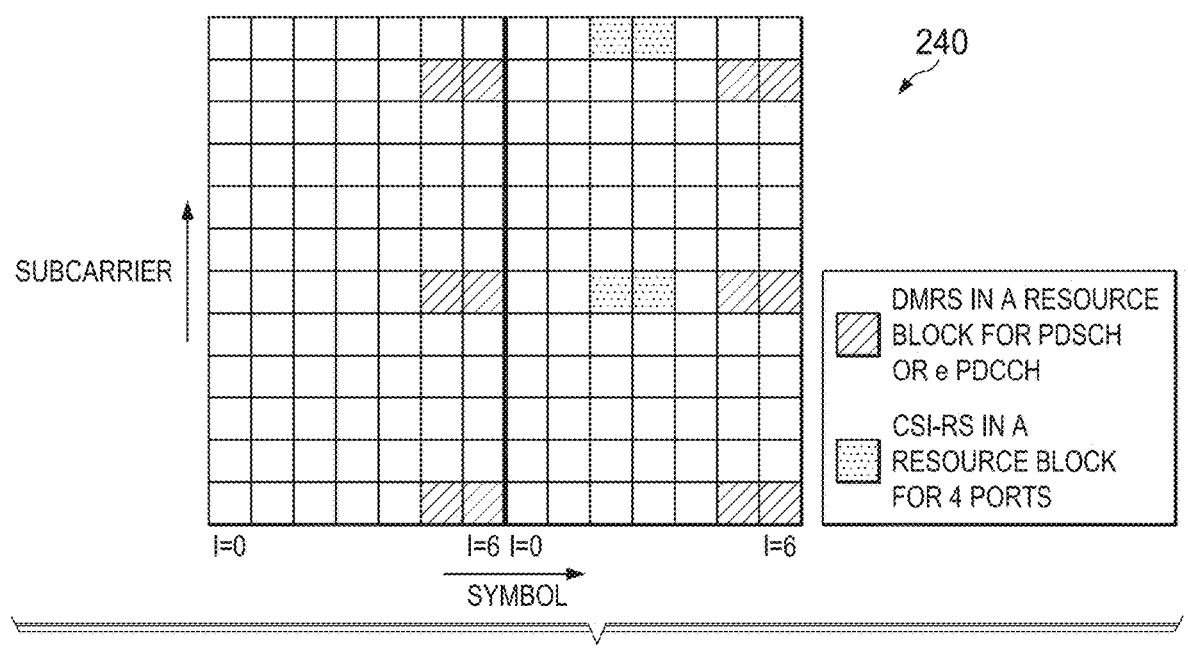
FIG. 2F illustrates an example channel status indicator reference signal (CSI-RS) and dedicated/de-modulation reference signal (DMRS)

In Rel-10, channel status indicator reference signal (CSI-RS) is introduced in addition to CRS and DMRS, as shown in FIG. 2F. CSI-RS is used for Rel-10 UEs to measure the channel status, especially for multiple antennas cases. PMI/CQI/RI and other feedback may be based on the measurement of CSI-RS for Rel-10 and beyond UE. PMI is the precoding matrix indicator, CQI is the channel quality indicator, and RI is the rank indicator of the precoding matrix. There may be multiple CSI-RS resources configured for a UE. There is specific time-frequency resource and scrambling code assigned by the eNB for each CSI-RS resource.

Figure 2G:
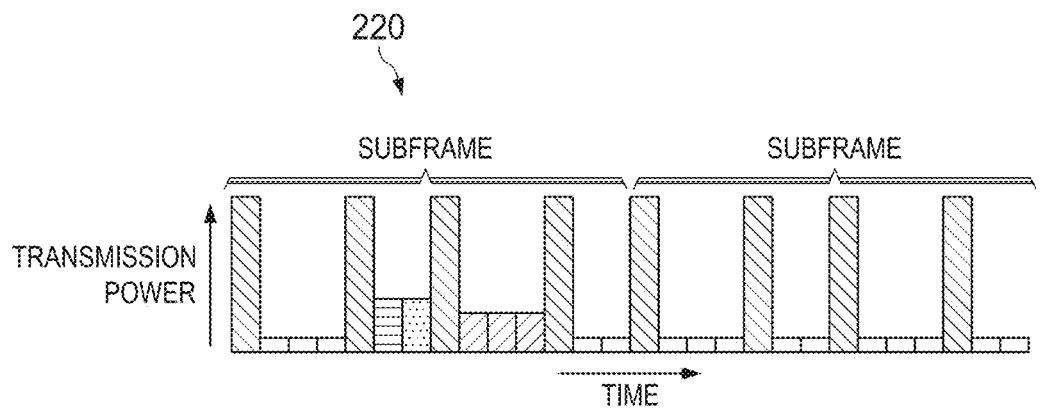
FIG. 2G illustrates an example of transmission power.

FIG. 2G shows an exemplary plot 220 of the transmission power from a communications controller, such as 105 in FIG. 1A, for an FDD configuration for subframes 0 and 1. Plot 220 shows the communication controller still transmits signals such as the CRS (solid shading), the SSS (horizontal shading), the PSS (dotted shading), and the PBCH (diagonal shading) even if there is no other data to transmit on the downlink. The transmission of these signals can increase the interference observed in a system such as in FIG. 1B even when communications controller 121 is not serving a UE such as wireless device 102. This interference can reduce the system capacity.

However, eliminating these signals entirely can impair system operation. For example, a wireless device relies on these signals to synchronize (both time and frequency) and then make measurements.

One concept to reduce the interference from eNBs without any UEs attached (assigned, camped) is to turn those eNBs off. When UEs arrive, the eNBs would then turn on. Likewise, when there is no more traffic, the eNBs could then turn off. However, there are many modifications to the standards in order to support the on-off mechanism (on/off adaptation) such as the UE identifying the quality of an eNB based on the persistent transmission of signals such as the PSS, SSS, and CRS; when those signals are absent, how the UE can measure the quality. Other questions regarding small cell on/off adaptation, or more generally, network adaptation, include:
1. Coverage issue: ensuring cellular coverage despite of small cell on/off;
2. Idle UE issue: can small cell operating on/off support UEs in the idle state, what needs to be done to support idle UEs, in the connected state can the UE/eNB exchange data;
3. Legacy UE support (how to support UEs that do not have this feature);
4. How may fast on/off adaptation be supported? More specifically, how may fast on/off adaptation be supported, given newly introduced procedures/mechanisms (in Rel-11/12 or even beyond) such as small cell discovery and measurement enhancements; dual connectivity or more broadly, multi-stream aggregation (MSA); CoMP and enhanced CoMP (eCoMP) (including CoMP Scenario 4 (a network with low power RRHs within the macrocell coverage where the transmission/reception points created by the RRHs have the same cell IDs as the macro cell), coordination over non-ideal backhaul); massive carrier aggregation, etc.

Typical deployment scenarios include a coverage layer whose cells do not perform network adaptation (or at least not too frequently or significantly), and a capacity layer whose cells (mainly small cells) may perform network adaptation. Coverage/mobility and idle UE support are mainly provided by the coverage layer. Typically UEs connect to cells in the coverage layer first, and then connect to small cells in the capacity layer when needed. The small cells may be co-channel or non-co-channel with those in the coverage layer. One example deployment is shown in FIG. 1B.

In an embodiment, as one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

The mechanism of dynamic on/off of a small cell is seen as more beneficial when further evolution of the small cell networks is envisioned. Specifically, to handle the ever increasing needs in data capacity, while meeting customer quality of service expectations and operators' requirements for cost-effective service delivery, the densification of a small cell network is proposed. Roughly speaking, doubling the density of the small cell network can yield doubling of the capacity of the network. However, densification leads to higher interference, especially the interference caused by common channels (e.g. CRS) which are persistently transmitted. Turning off the small cell opportunistically can significantly help reduce interference and improve efficiency of the dense network.

In parallel with increasing the network resources by densifying the network, another way to increase the network resources is to utilize more and more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared-licensed spectrums; some of the spectrum resources lie in high-frequency bands, such as 6 GHz to 60 GHz. The unlicensed spectrums can be used by generally any user, subject to regulation requirements. The shared-licensed spectrums are also not exclusive for an operator to use. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Due to the fact that the licensed spectrum is generally scarce and expensive, utilizing the unlicensed spectrum by the cellular operator may be considered. Note that on high-frequency bands and unlicensed/shared-licensed bands, typically TDD is used and hence the channel reciprocity can be exploited for the communications.

On unlicensed spectrum, generally there is no pre-coordination among multiple nodes operating on the same frequency resources. Thus, a contention-based protocol (CBP) may be used. According to Section 90.7 of Part 90 (paragraph 58) of the United States Federal Communication Commission (FCC), CBP is defined as:

CBP—"A protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel." Note that the state of a channel being busy may also be called as channel unavailable, channel not clear, channel being occupied, etc., and the state of a channel being idle may also be called as channel available, channel clear, channel not occupied, etc.

One of the most used CBP is the "listen before talk" (LBT) operating procedure in IEEE 802.11 or WiFi (which can be found in, e.g., "Wireless LAN medium access control (MAC) and physical layer (PHY) specifications," IEEE Std 802.11-2007 (Revision of IEEE Std 802.11-1999)), which is hereby incorporated herein by reference. It is also known as the carrier sense multiple access with collision avoidance (CSMA/CA) protocol. Carrier sensing is performed before any transmission attempt, and the transmission is performed only if the carrier is sensed to be idle, otherwise a random backoff time for the next sensing is applied. The sensing is generally done through a clear channel assessment (CCA) procedure to determine if the in-channel power is below a given threshold.

In ETSI EN 301 893 V1.7.1, which is hereby incorporated herein by reference, Clause 4.9.2, it describes 2 types of Adaptive equipment: Frame Based Equipment and Load Based Equipment. To quote the specification:

"Frame Based Equipment shall comply with the following requirements:
1) Before starting transmissions on an Operating Channel, the equipment shall perform a Clear Channel Assessment (CCA) check using "energy detect". The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in point 5 below. If the equipment finds the Operating Channel(s) to be clear, it may transmit immediately (see point 3 below).
2) If the equipment finds an Operating Channel occupied, it shall not transmit on that channel during the next Fixed Frame Period.
NOTE 1: The equipment is allowed to continue Short Control Signaling Transmissions on this channel providing it complies with the requirements in clause 4.9.2.3.
NOTE 2: For equipment having simultaneous transmissions on multiple (adjacent or non-adjacent) Operating Channels, the equipment is allowed to continue transmissions on other Operating Channels providing the CCA check did not detect any signals on those channels.
3) The total time during which an equipment has transmissions on a given channel without re-evaluating the availability of that channel, is defined as the Channel Occupancy Time. The Channel Occupancy Time shall be in the range 1 ms to 10 ms and the minimum Idle Period shall be at least 5% of the Channel Occupancy Time used by the equipment for the current Fixed Frame Period. Towards the end of the Idle Period, the equipment shall perform a new CCA as described in point 1 above.
4) The equipment, upon correct reception of a packet which was intended for this equipment, can skip CCA and immediately (see note 3) proceed with the transmission of management and control frames (e.g. ACK and Block ACK frames). A consecutive sequence of such transmissions by the equipment, without it performing a new CCA, shall not exceed the Maximum Channel Occupancy Time as defined in point 3 above.
NOTE 3: For the purpose of multi-cast, the ACK transmissions (associated with the same data packet) of the individual devices are allowed to take place in a sequence.
5) The energy detection threshold for the CCA shall be proportional to the maximum transmit power ($P_H$) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−$P_H$ (assuming a 0 dBi receive antenna and $P_H$ specified in dBm e.i.r.p.)."

"Load based Equipment may implement an LBT based spectrum sharing mechanism based on the Clear Channel Assessment (CCA) mode using "energy detect", as described in IEEE 802.11™-2007 [9], clauses 9 and 17, in IEEE 802.11n™-2009 [10], clauses 9, 11 and 20 providing they comply with the conformance requirements referred to in clause 4.9.3 (see note 1) (all of which are hereby incorporated herein by reference).

NOTE 1: It is intended also to allow a mechanism based on the Clear Channel Assessment (CCA) mode using "energy detect" as described in IEEE 802.11ac™ [i.2], clauses 8, 9, 10 and 22 (which are hereby incorporated herein by reference), when this becomes available.

Load Based Equipment not using any of the mechanisms referenced above shall comply with the following minimum set of requirements:
1) Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).
2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.
NOTE 2: The equipment is allowed to continue Short Control Signaling Transmissions on this channel providing it complies with the requirements in clause 4.9.2.3.
NOTE 3: For equipment having simultaneous transmissions on multiple (adjacent or non-adjacent) operating channels, the equipment is allowed to continue transmissions on other Operating Channels providing the CCA check did not detect any signals on those channels.

3) The total time that an equipment makes use of an Operating Channel is the Maximum Channel Occupancy Time which shall be less than (13/32)×q ms, with q as defined in point 2 above, after which the device shall perform the Extended CCA described in point 2 above.

4) The equipment, upon correct reception of a packet which was intended for this equipment, can skip CCA and immediately (see note 4) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence.

5) The energy detection threshold for the CCA shall be proportional to the maximum transmit power ($P_H$) of the transmitter: for a 23 dBm e.i.r.p. transmitter the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−$P_H$ (assuming a 0 dBi receive antenna and $P_H$ specified in dBm e.i.r.p.)."

FIGS. 3A and 3B are block diagrams of embodiments of systems 300, 350 for analog beamsteering plus digital beamforming. System 300 in FIG. 3A includes a baseband component 302 for digital processing, a plurality of RF chain components 304, a plurality of phase shifters 306, a plurality of combiners 308, and a plurality of antennas 310. The diagram may be used for transmission or receiving. For simplicity, we describe the diagram assuming this is for transmission; receiving may be understood similarly. Each RF chain 304 receives a weighting factor (or weight, $p_1, \ldots, p_m$ as shown in the figure) from the baseband component 302. The collection of the weighting factors forms the digital precoding vector, precoding matrix, beamforming vector, or beamforming matrix for the transmission. For example, a precoding vector may be $[p_1, \ldots, p_m]$. When multiple layers/streams are transmitted, a precoding matrix may be used by the baseband unit to generate the weighting factors, which each column (or row) of the matrix is applied to a layer/stream of the transmission. Each RF chain 304 is coupled to a plurality of phase shifters 306. The phase shifters may, theoretically, apply any phase shift values, but generally in practice, only a few possible phase shift values, e.g., 16 or 32 values. Each RF chain 304 generates a narrow beam 312 oriented in a direction determined by the settings on the phase shifters 306 and combiners 308. If the phase shifters can apply any phase shift values, the beam may point to any direction, but if only a few phase shift values can be used, the beam may be one of few possibilities (e.g., in the figure, the solid narrow beam is selected by setting a specific phase shift value in the RF chain, and the beam is among all the possible narrow beams shown as solid and dotted beams corresponding to all the possible phase shift values). Each RF chain selects such a narrow beam, and all such narrow beams selected by all the RF chains will be further superposed. How the superposition is done is based on the digital weighting factors. The factor can make a beam from a RF chain stronger or weaker, and therefore, a different set of the factors can generate different superpositions in the spatial domain; in the figure, a particular beam 314 is illustrated. In other words, by selecting different digital weighting factors, different beam 314 can be generated. The digital operations may generally refer to as (digital) beamforming or precoding, and the analog operations as (analog) beamsteering or phase shifting, but sometimes there is no clear distinctions.

System 350 in FIG. 3B is similar to system 300 in FIG. 3A except that corresponding combiners 308 in each RF chain 302 are connected to one another.

Figure 4:
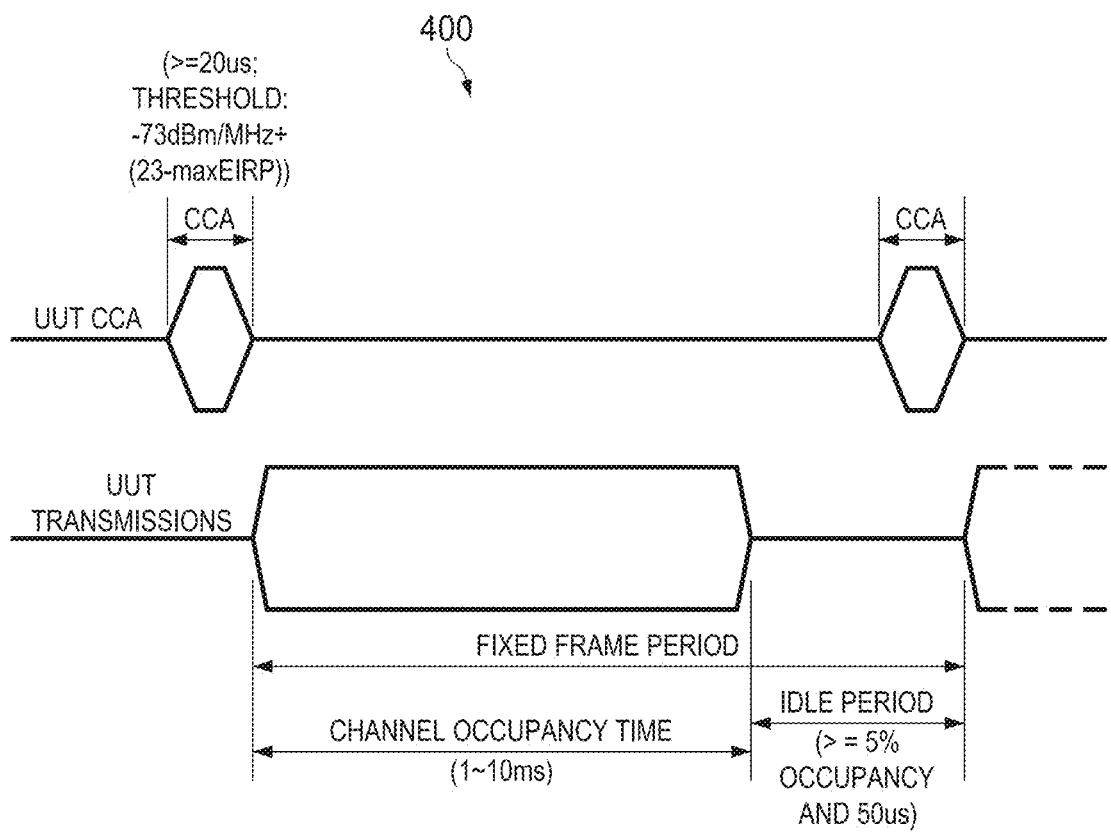
FIG. 4 illustrates an example of Frame based equipment operating in unlicensed spectrum.
Figure 5:
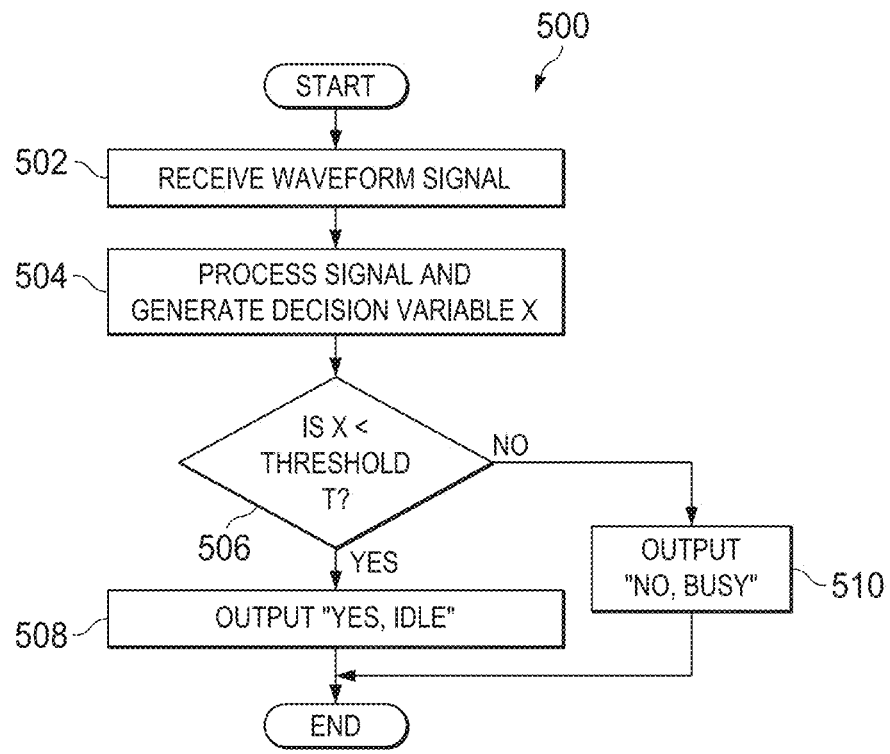
FIG. 5 is a flowchart for an example of traditional carrier sensing.

An example of timing 400 for Frame Base Equipment is illustrated in FIG. 4. An example of the flow chart for an embodiment method 500 for carrier sensing is illustrated in FIG. 5. A flow chart of an embodiment method 600 for a general listen-before-talk mechanism is illustrated in FIG. 6.

Referring now to FIG. 5, the method 500 begins at block 502 where the communication controller receives a waveform signal from a UE. At block 504, the communication controller processes the signal and generates a decision variable, X. The signal processing here, in general done in the digital domain which is normally performed in baseband, may include sampling, A/D conversion, receiver's digital combining with precoding weighting, etc. The decision variable, X, is used to determine whether the channel is idle or busy. At block 506, the communication controller determines whether the decision variable is less than a threshold, T. The threshold may be a standardized value, or derived from a standard or some regulation, which may be device type specific, spatial specific, etc. The threshold may also be allowed to change within a specified range according to the traffic loads, interference conditions, etc. If, at block 506, the communication controller determines that the value of the decision variable, X, is less than the threshold, T, the method 500 proceeds to block 508 where the communication controller determines that the carrier channel is idle, after which, the method 500 ends. If, at block 506, the communication controller determines that the value of the decision variable, X, is not less than the threshold, T, then the method 500 proceeds to block 510 where the communication controller determines that the carrier channel is busy, after which, the method 500 ends.

Figure 6:
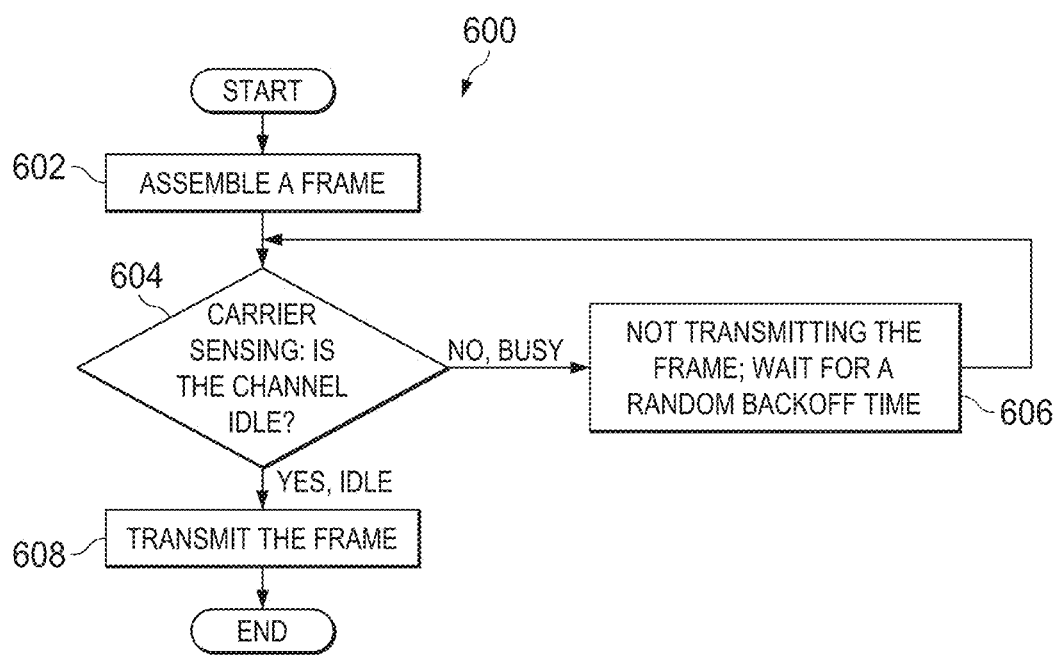
FIG. 6 is a flowchart for an example of traditional listen-before-talk mechanism.

Referring now to FIG. 6, the method 600 begins at block 602 where the communication controller assembles a frame. At block 604, the communication controller performs carrier sensing, such as described above with reference to FIG. 5, to determine if the channel is idle. If, at block 604, the communication controller determines that the channel is not idle, but is busy, then the method 600 proceeds to block 606 where the communication controller refrains from transmitting the frame and waits for a random backoff timer to expire, after which, the method returns to block 604. If, at block 604, the communication controller determines that the channel is idle, then the method 600 proceeds to block 608 where the communication controller transmits the frame, after which, the method ends.

Figure 7:
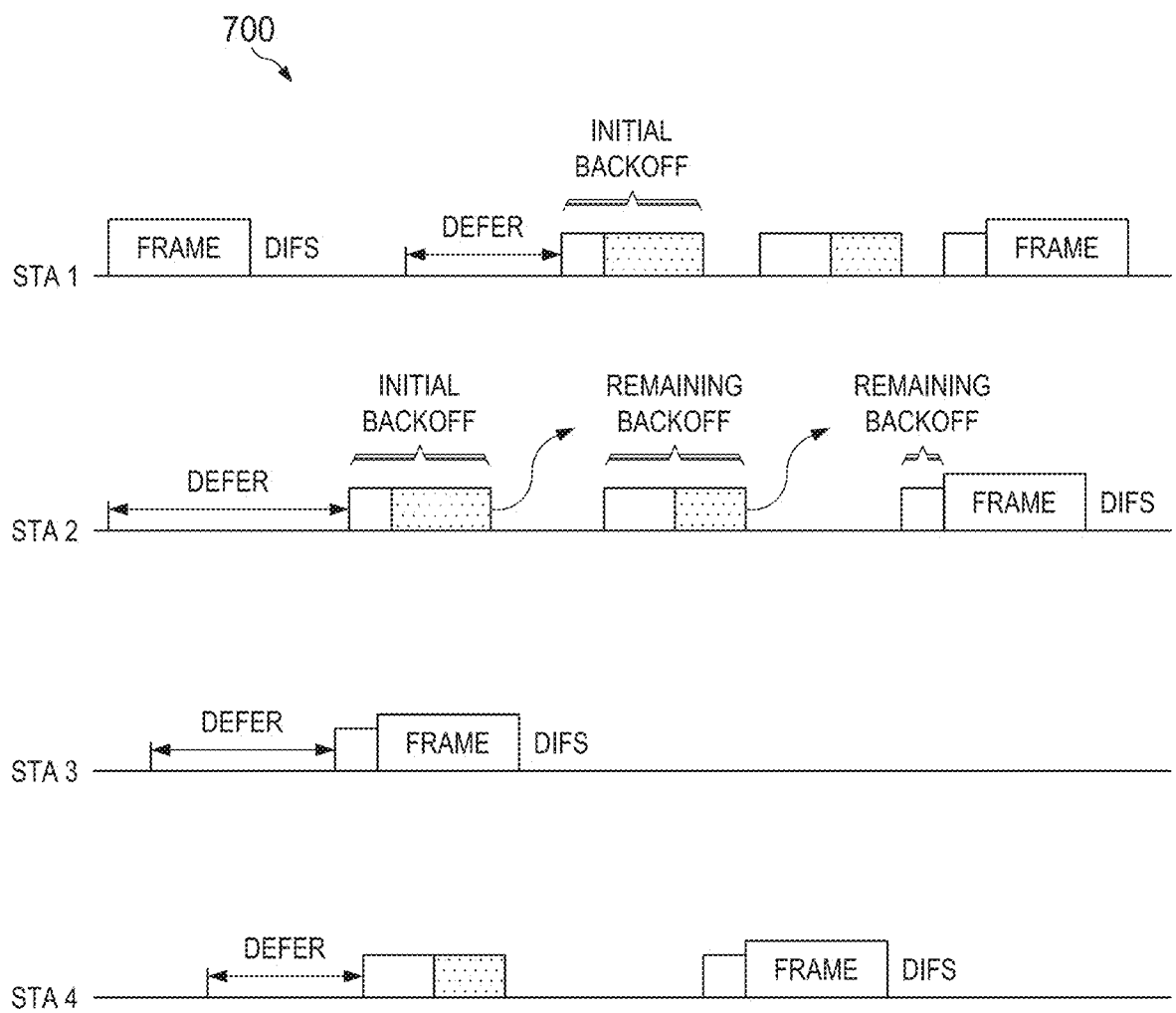
FIG. 7 illustrates a channel access procedure for WiFi.

WiFi is the most eminent example of applying the listen-before-talk mechanism. WiFi uses 802.11 standards technologies such as the air interface (including physical and MAC layer). In 802.11, the communication channel is shared by stations under a mechanism called distributed channel access with a function called DCF (distributed coordination function), which uses CSMA/CA. The DCF uses both physical and virtual carrier sense functions to determine the state of the medium. The physical carrier sense resides in the PHY and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station with a data frame for transmission first performs a CCA by sensing the wireless channel for a fixed duration, i.e., the DCF inter-frame space (DIFS). If the wireless channel is busy, the station waits until the channel becomes idle, defers for a DIFS, and then waits for a further random backoff period (by setting the backoff timer with an integer number of slots). The backoff timer decreases by one for every idle slot and freezes when the channel is sensed busy. When the backoff timer reaches zero, the station starts data transmission. The channel access procedure 700 is shown in FIG. 7.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

Figure 8A:
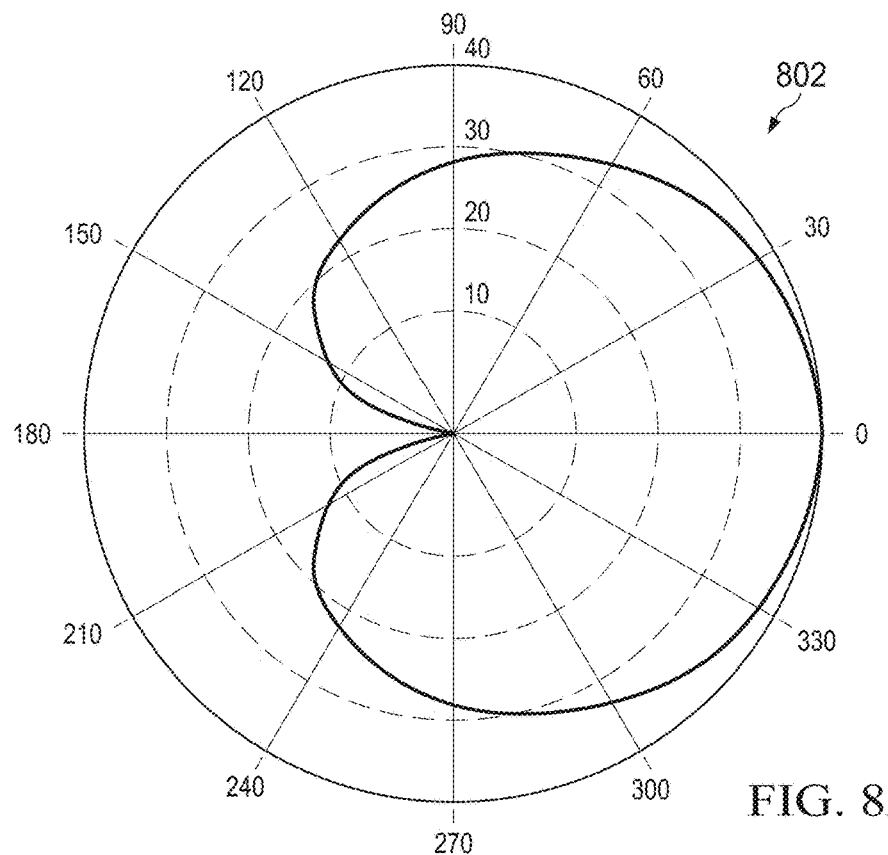
FIGS. 8A-8B illustrate an example of antenna pattern with a normal (wide) beam (A) and an example of antenna pattern with a narrow beam (B)
Figure 8B:
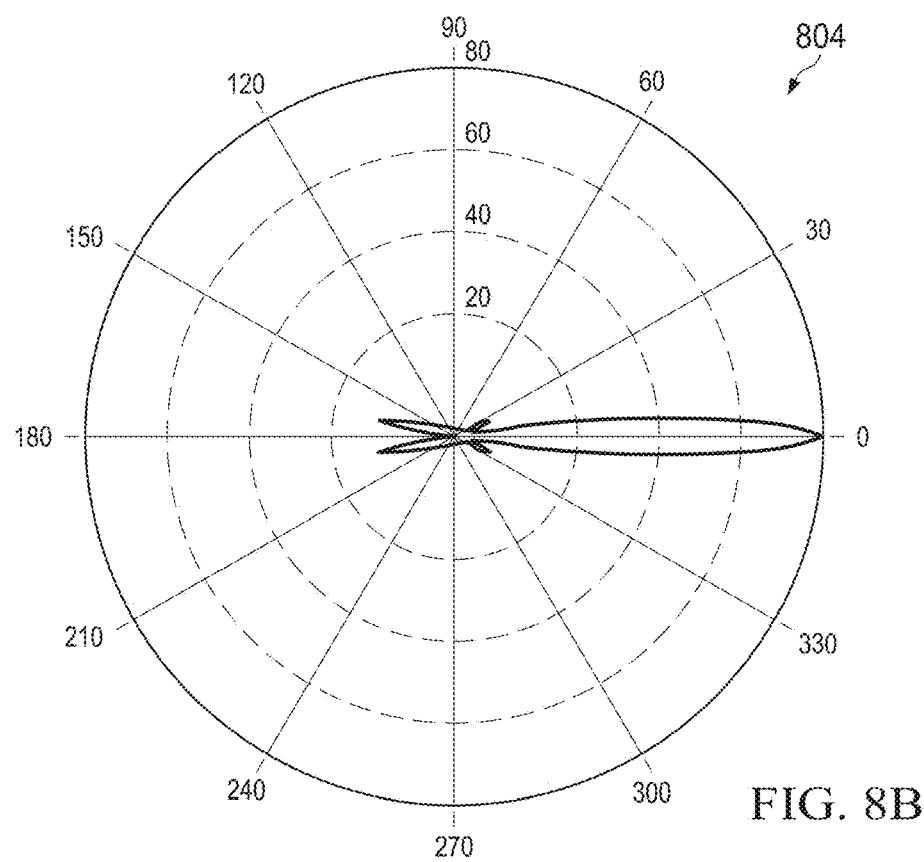

In addition, for operations in high-frequency bands, especially in the bands at 28 GHz to 60 GHz, they generally belong to the mmWave regime, which has quite different propagation characteristics from microwave (generally below 6 GHz). For example, mmWave experiences higher pathloss over distance than microwave does. Therefore, high-frequency bands are more suitable for small cell operations than macro cell operations, and they generally rely on beamforming with a large number of antennas (e.g. >16, and sometimes maybe even a few hundred) for effective transmissions. Note that at high frequency, the wavelengths, antenna sizes, and antenna spacing can all be smaller than those at low frequency, thus making it feasible to equip a node with a large number of antennas. As a result, the beams formed by the large number of antennas can be very narrow, for example, with beamwidth of 10 deg or even less. In sharp contrast, in traditional wireless communications, beamwidth is generally much wider, such as tens of degrees. See FIG. 8A for an illustration of the wider beam pattern 802 with a small number of antennas in low frequency, and FIG. 8B for an illustration of the narrow beam pattern 804 with a large number of antennas in high frequency. In general, it is regarded that narrow beams are a major new feature of mmWaves. As a general rule of thumb, the beamforming gain by massive MIMO can be roughly estimated by N×K, where N is the number of transmit antennas and K the receive antennas. This is because the 2-norm of the channel matrix H scales roughly according to $(N \times K)^{1/2}$, and therefore if the precoding vector by the transmitting node is p, and the combining vector by the receiving node is w, then the composite channel is w'Hp, and by properly selecting w and p, the composite channel gain in energy can attain N×K, much higher than the case with fewer antennas.

Thus, it can be seen that when considering further evolution of the small cell networks, the main scenarios may be small cell networks with abundant resources in both node-density dimension and spectrum dimension, where the spectrum resources may be in high frequency and/or in unlicensed/shared-licensed bands. The small cells are overlaid with wider-area macro cells. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected resources are needed.

Next, we identify some problems we have discovered that may be encountered for some hot area communications. For the small cells operating in high-frequency unlicensed/shared-licensed band, the small cells may need to perform carrier sensing before transmissions. However, as previous discussed, there is a significant difference of the energy emission spatial patterns and interference spatial distributions between mmWave and microwave. The interference that may be sensed during the sensing period is likely to be narrow-beam interference (due to the beamforming done by a large number of antennas), and the transmission that may be done is also likely to be narrow-beam transmission. Roughly speaking, the communications between two nodes are somewhat (more) similar to those over a dedicated channel, with interference (leakage out of the narrow beam) mainly concentrated along the transmission direction. Associated with this is that the spatial distribution of nodes whose communications may be affected by a narrow beam is considerably different than that of nodes whose communications may be affected by a wider (normal) beam. In other words, the existing collision avoidance mechanism designed for wider beams may not be suitable for hot area operations. To achieve efficient collision avoidance in narrow-beam scenarios, existing listen-before-talk mechanism may need to be reexamined and appropriately modified.

Figure 9:
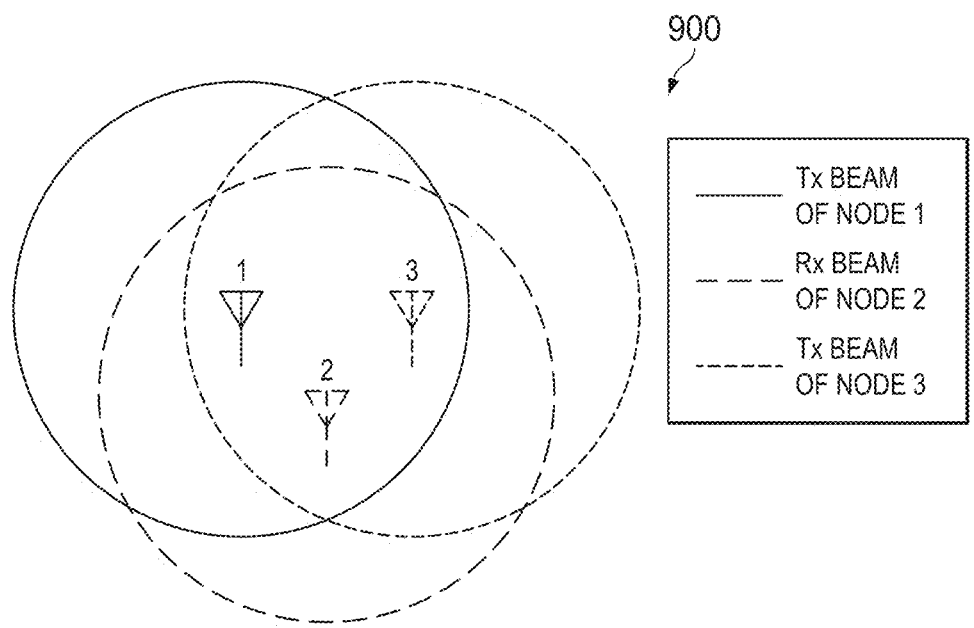
FIG. 9 illustrates an example of multiple nodes accessing a carrier using traditional listen-before-talk mechanism.

For simplicity, consider transmission/reception in the horizontal plane only; transmission/reception in 3D space can be understood likewise. See system 900 in FIG. 9 with 3 nodes and their ranges with traditional very wide antenna beams. Suppose node 1 is transmitting to node 2. A collision at node 2 may occur only if an interfering beam from another node, called node 3, hits node 2. To avoid the collision, node 1 may not transmit if it senses node 3 transmitting, and node 3 may not transmit if it senses node 1 transmitting. This is the main intuition behind the CSMA/CA protocol. Note that, however, the so called hidden/exposed node problems are not considered in this thinking; that is, whether the receiving node 2 can sense from the interfering node 3 or not. Instead, this thinking works well if node 1 and node 2 are "close enough" so that if node 1 is within/beyond the range of node 3, then node 2 is also within/beyond the range of node 3. Namely, the sensibility of node 3 at node 1 roughly represents the sensibility of node 3 at node 2. This holds in general scenarios, though in some scenarios the hidden/exposed node problems exist.

Figure 10:
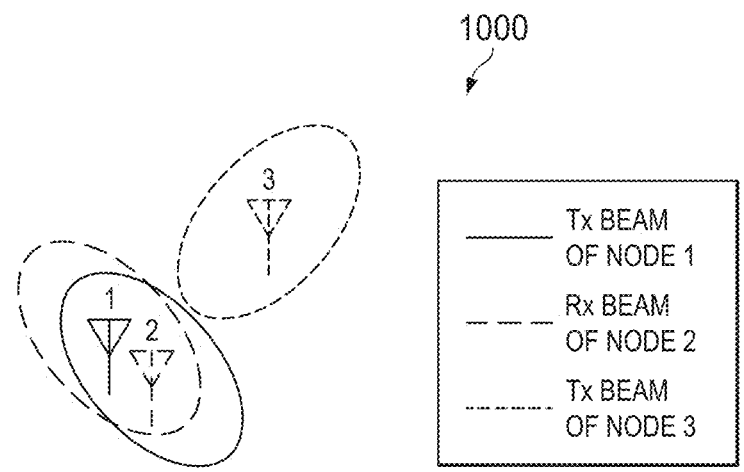
FIG. 10 illustrates an example of multiple nodes accessing a carrier in narrow-beam setting.

Now consider an embodiment narrow-beam transmissions system 1000 in high frequency as illustrated in FIG. 10 with 3 nodes and their ranges with narrow beams. Again suppose node 1 is transmitting to node 2. A collision at node 2 may occur only if an interfering beam from node 3 hits node 2. However, the precoding for node 3 is such that in general the beam of node 3 is not pointing to either node 1 or node 2, and even if the beam of node 3 hits node 2 (e.g., when it is pointing to node 2 or it leaks to node 2 with certain energy), the receiver combining for node 2 is such that in general the receiver of node 2 is not sensitive to the transmission from node 1. It may be true that node 2 can sense node 3 if node 2 adjusts its receiver combining weights to point to node 3, but node 2 does not do so since it adjusts its receiver combing weights to point to node 1, which is generally a different direction. In other words, collision at node 2 may be avoided due to node 2's highly spatially selective reception. This implies that node 1 may still be able to transmit to node 2 even if the beam of node 3 hits node 1. For example, if node 1 senses node 3 but node 3's beam is not likely to be aligned with node 2's receiving direction, then node 1 can still transmit to node 2 without concerning about collision at node 2. Therefore, the sensing by node 1 (or by node 3, similarly) may be performed directionally for deciding if a transmission can occur or not.

Figure 11:
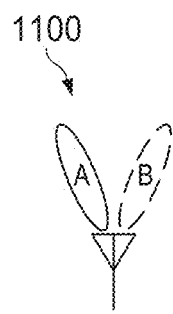
FIG. 11 illustrates an example of two (transmitted or received) beams at a nodes.

To better understand this, see system 1100 in FIG. 11 for an illustration of two beams arriving at a node's receiver. If the receiver has an omni-directional antenna, then both beams are weighted equally in the receiver. If the receiver can apply combining weights, then it can weigh one beam higher than the other beam. Generally the receiver may adjust so that it is aligned with the desired beam (say, beam A), and it can then discount the impact of the interfering beam B. Therefore, beam B may contribute much less to the received power at the node, i.e., the interfering beam may not be sensible if a certain receiver combining vector is applied. Note that the vector may be applied in analog domain and/or digital domain; in digital domain the receiver does the post-processing of the received signals. Moreover, the node may need to transmit towards the direction of beam A, for this purpose it can select its precoding vector as the receiver combining vector by exploiting the channel reciprocity.

Essentially the above indicates that the concept of sensibility may be different in scenarios with narrow-beam transmission/reception in high frequency, and accordingly the sensing should be done differently under the new sensibility setting.

Figure 12:
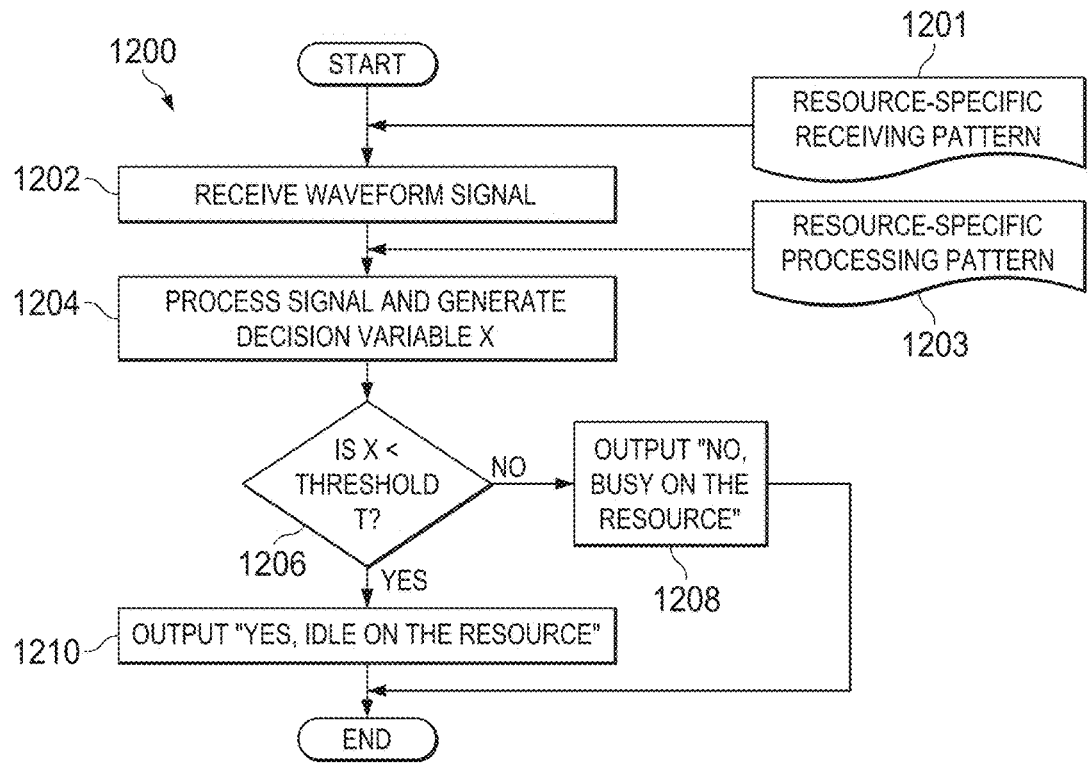
FIG. 12 is a flowchart for an example of spatial-resource-specific carrier sensing.

FIG. 12 is a flowchart of an embodiment method 1200 for spatial-specific carrier sensing. Method 1200 is in contrast with the traditional carrier sensing illustrated in FIG. 5. In an embodiment, before receiving a waveform signal at block 1202 during the sensing time, the node is provided (e.g., by a certain component of the node, such as the scheduler of the node which allocates transmission resource for an associated transmission) with a resource-specific receiving pattern at block 1201, and the node applies the pattern for its receiving. In an embodiment, the resource-specific receiving pattern is a spatial-specific receiving pattern. For example, the pattern may be used by the node to steer its antennas towards certain directions, or change its downtilt, etc. In other words, the pattern may specify a spatial-domain antenna pattern. Note that the spatial-domain antenna receiving pattern is only part of the receiver beamforming; the spatial-domain antenna receiving pattern is used to adjust the (analog, RF) phase shifters of the antennas, and it can be used in conjunction with the digital processing after the RF chains for receiver beamforming. For another example, the pattern may specify a spatial-domain antenna pattern and/or a frequency-domain pattern, and then the node may tune its RF accordingly. In general, the spatial-specific receiving pattern may be extended to resource-specific receiving pattern which specifies the spatial resource along which the antennas should point to, the frequency resource the receiving should be done, etc.

At block 1204, after the receive antennas receive the waveform signal at block 1202, the node performs some (digital) processing after the RF chains. In an embodiment, before the processing at block 1204, the node is provided (e.g., by a certain component of the node, such as the scheduler of the node which allocates transmission resource for an associated transmission) with a spatial-specific processing pattern at block 1203, and the node applies the pattern for its processing in block 1204. For example, the pattern may be used by the node to combine the received signals on different antennas so that effectively the receiver forms a beam towards a certain direction in spatial domain. To be more specific, if there are M RF chains used for the receiving and M received signals are obtained by the RF chains, then the spatial-specific processing pattern can be an M-length vector (or multiple M-length vectors) to combine the received signals such that the receiver beamforming points to a desired direction. In general, the spatial-specific processing pattern may be extended to resource-specific processing pattern which specifies the spatial resource along which the antennas should point to, the frequency resource the processing should be done, etc.

After the receiver processing at block 1204, the method proceeds to block 1206 where the receiver generates a decision variable, X and compares the decision variable, X, with a decision threshold, T. The decision variable, X, is generally a scalar number reflecting the received energy level along the direction of the composite receiver beam. The threshold, T, may be determined by a number of factors, such as the power level of the node, the power level of the associated transmission. If, at block 1206, the decision variable, X, does not exceed the threshold, T, then the method 1200 proceeds to block 1210 where the channel is considered as "idle on the spatial resource" and hence the node can transmit on this spatial resource; otherwise, the method 1200 proceeds to block 1208 where the channel is considered as busy/occupied on the spatial resource and hence the node cannot transmit on this spatial resource.

Figure 13:
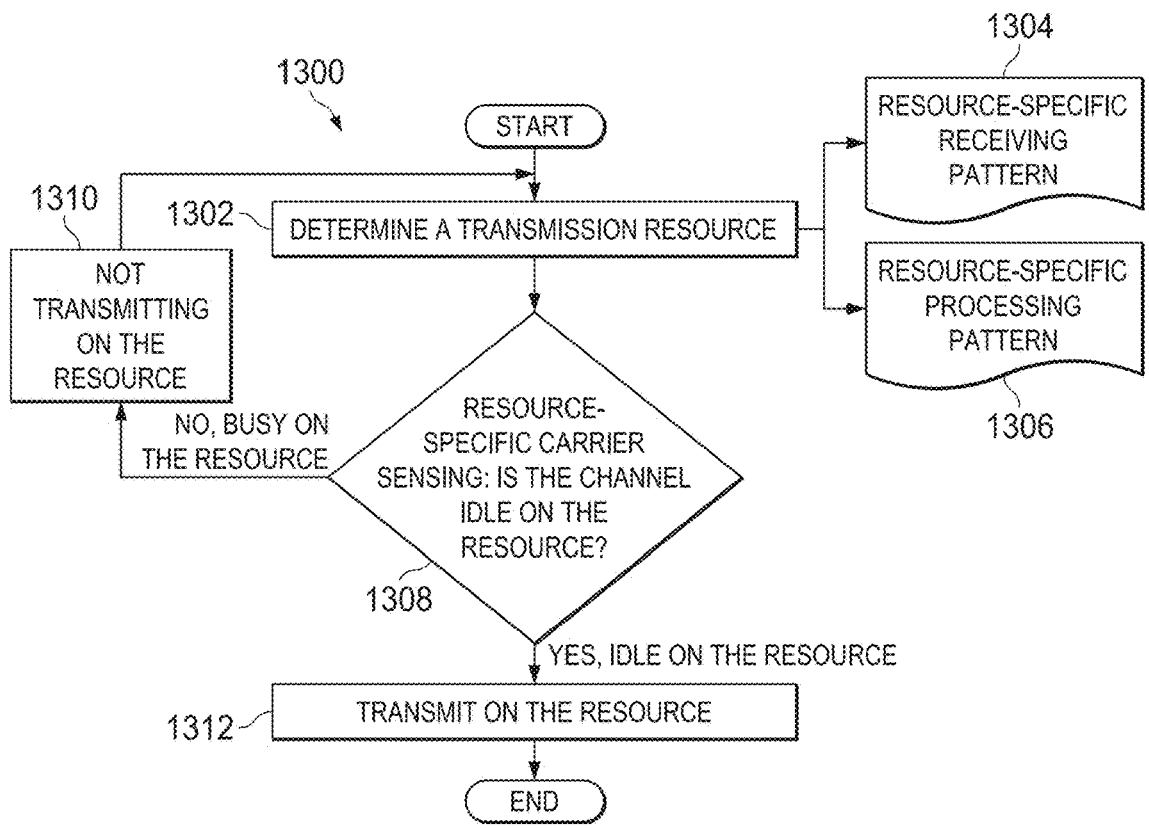
FIG. 13 is a flowchart for an example of spatial-resource-specific listen-before-talk mechanism.

This embodiment of spatial-specific carrier sensing can be used as the core of spatial-specific LBT. FIG. 13 is a flow chart of an embodiment method 1300 for spatial-specific LBT. The method 1300 begins at block 1302 where the node determines a transmission resource. For example, suppose the node is attempting to transmit using a specific transmission resource; the transmission resource may specify which time/frequency/spatial/power resources the transmission will be performed. For example, the transmission resource specifies the spatial resource along which the transmit antennas should point to, the frequency resource the transmission should be done, the power level that the transmission will use, etc. Specifically, consider the case that the resource specifies the precoding of the transmission; in other words, the node is attempting to transmit toward a certain direction. Then, at block 1301 and block 1302 associated with the transmission resource (i.e., the beamforming direction of the transmission), the node generates a spatial-specific receiving pattern and/or spatial-specific processing pattern. The generated patterns may be such that the received signal is received and processed in a way related to the attempted transmission. Some embodiments of the relation between the receiving/processing patterns and the transmission pattern will be given later. For example, the receiving/processing patterns are such that the receiver beam direction is aligned with the beam direction of the transmission resource.

At block 1308, spatial-specific carrier sensing is performed, and the node determines whether the channel is considered as idle or busy/occupied on the transmission resource (i.e., the beamforming direction of the transmission in this case). If, at block 1308, the channel is considered as idle, then the node can transmit on the transmission resource and the method 1300 proceeds to bock 1312 where the node transmits on the resource; otherwise, if, at block 1308, the channel is busy, the node cannot transmit on the transmission resource, then the method 1300 proceeds to block 1310 where the node does not transmit on the resource, after which, the method 1300 proceeds to block 1302. In the latter case, the node may attempt another transmission on another transmission resource, e.g., it may simply choose another choose another precoding direction, or choose another time (which is the behavior of conventional LBT), or choose another frequency resource, or choose another power level of the transmission (e.g. reducing the transmission power so that the sensing threshold is increased), etc. This new attempted transmission may or may not be actually performed depending on the sensing result on the new transmission resource. The new attempted transmission may be another attempt of the previous transmission, i.e., it may be for the same data to the same recipient, but using a different direction and/or a different frequency resource, etc. On the other hand, the new attempted transmission may not be the same as the one; for example, it can be for another recipient. In other words, if the initial attempt did not go through due to some other transmission ongoing on that direction, the node may decide to transmit on a different direction which is generally associated with a different UE. That is, the node may exploit multi-user diversity when deciding its transmission resources. After a failed attempt (i.e., an attempt to transmit along some direction but it does not go through), the node gains knowledge about which direction it cannot transmit, and the node can better schedule its next attempted transmission so that it may have a better chance to go through. For example, from the failed attempt, the node knows that along a direction the received signal is very strong, then the node may choose to avoid this direction as much as possible, such as choosing to transmit to an orthogonal direction.

Alternatively, the node may attempt to transmit on several transmission resources at the same time, but select only those associated with idle channels for its actually transmissions. For example, after the node receives the waveform signal and the RF chain generates received signals, several different vectors (i.e. spatial-specific processing patterns) used for combining the received signals can be provided (e.g., by a certain component of the node). For each vector, a decision variable can be generated, and hence the receiver can obtain several decision variables. Then the one with the smallest value (relative to the associated decision threshold) is selected if it does not exceed the associated threshold, and the associated spatial-specific processing pattern is selected. This pattern may be further associated with a transmission direction, and then the node will transmit on that direction. The node may also compute a suitable spatial-specific processing pattern for its next transmission, for example, the receiver solves an optimal combining problem given the signals generated by the RF chains, generating a beam direction along which the channel is considered as idle, and then transmits along that direction. For example, the output of the RF chains may be a vector y, and then the receiver picks one vector in the null space of the vector y as the optimal spatial-specific processing pattern, and the next transmission will be associated with this pattern. Note that the null space of the vector y generally contains infinite number of vectors, and any of them may be used as the spatial-specific processing pattern. The node can then project the directions to its recipients into the null space and pick the one with the largest projection value.

In an embodiment, the node sensing the channel status sets its receiver combining weights to be equal to the precoding for the desired transmission, if the receiver antenna number is equal to the transmitter antenna number. In other words, if the interference projected to the desired transmission direction (by applying the post-combining receiver antenna pattern when sensing the interference) is weak, effectively the node does not "hear" the interference and it can still transmit.

In an embodiment, the node sensing the channel status sets its receiver combining weights so that the receiver beam direction is aligned with the beam direction for the desired transmission. Note that the receiver may not use the same number of antennas as the transmitter, but the incoming beam and outgoing beam can still be aligned, though the beamwidths may not be exactly the same (due to the antenna number difference).

In an embodiment, the node sensing the channel status sets its receiver combining weights based on the beam direction for the desired transmission. For example, the receiver beam direction for sensing may be selected to form a certain angle with the transmitter beam direction for the associated transmission. For another example, the receiver beam direction for sensing may be selected to form a 0 degree angle and 180 degree angle (i.e. two opposite beams) to the transmitter beam direction for the associated transmission; this may be useful if the interfering node is lined up with the transmitter and receiver but its location is unknown to the transmitter. For another example, the receiver beam direction for sensing may be selected as orthogonal to the transmitter beam direction for the associated transmission.

In an embodiment, the node first senses the channel status by digitally combining the received signals during the sensing period, and then decides on the precoding vector for the transmission following the sensing period. In other words, the precoding for the following transmission is correlated with the sensed signal. For example, by digitally processing the received signal, the node identifies certain directions along which the sensed signal is very weak, and then the node decides to transmit along one of these directions. Note that the node may have multiple UEs to serve and they are distributed in different directions. Therefore, the node may exploit multi-user diversity gain in this case. Alternatively, the node may decide to beamform in a direction forming a certain angle with the strongest sensed beam direction, such as orthogonal to the strongest sensed beam direction. In general, these embodiments specify spatial-resource restricted sensing.

In an embodiment, the node sensing the channel status sets its electronic downtilt according to the desired transmission downtilt. In another embodiment, the node sets its electronic downtilt for transmission based on the sensed signal.

In an embodiment, the node uses location information to identify its sensing beam direction and/or transmission beam direction. The location information may contain information about the receiving node location, the interfering node location, etc. The location information may be obtained by any location technology, e.g. GPS, or RF signatures, etc. With the location information, the node may build a geographic "map" of the surrounding nodes and better adapt its sensing and transmitting beam directions to avoid collision.

In an embodiment, the node senses on the resources in spatial-frequency domain based on the resources on which the desired transmission is to be performed. For example, if the node will transmit along a direction only on a subset of the frequency resource, such as a subband, then the node may need to sense along the associated sensing direction(s) on the subband. Note that in this case, other subbands in the channel may be used by the node (for transmissions along other directions) or not used by the node (e.g., used by WiFi nodes operating on partially overlapped channels). In another embodiment, the node senses in full bandwidth in multiple directions, but the node digitally processes the received signal to identify the interference directions in subbands, and then decides its transmissions on subbands based on the processed results. For example, it may identify a particular band and a beam direction for one of its UEs to receive with potentially lower interference. In summary, these embodiments specify resource-specific sensing, where the resources can be in spatial-frequency domain.

In an embodiment, the node is desired to transmit more than one stream, such as performing a rank 2 transmission or a multi-user MIMO transmission. More than one beam needs to be formed for this transmission, and accordingly, more than one sensing beam needs to be formed during the sensing.

In an embodiment, the threshold used for determine the sensibility during the sensing is a power level used to threshold the received post-combing signal. Alternatively, the one-dimensional (scalar) threshold corresponding to a sphere (i.e., non-spatially selective) criterion is replaced by a multi-dimensional (vector or continuous function) threshold corresponding a spatially selective criterion. The threshold may be different on different subbands. The threshold may also be different for different transmission power associated with a transmission, for example, a higher transmission power should be associated with a lower threshold, such as according to the CCA threshold level TL formula: TL=−73 dBm/MHz+23−P, assuming a 0 dBi receive antenna and the transmission power P specified in dBm e.i.r.p.

Figure 14:
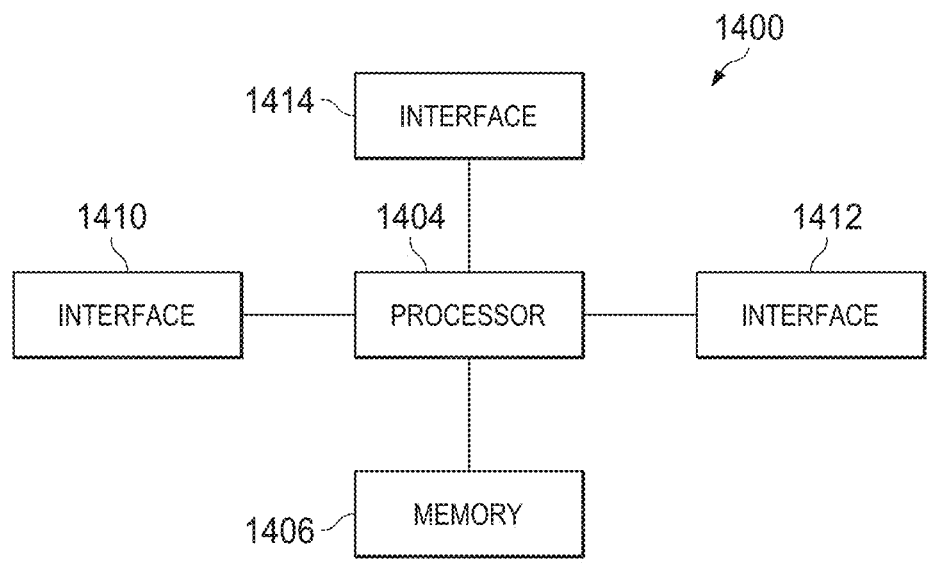
FIG. 14 illustrates a block diagram of an embodiment processing system performing methods described herein, which may be installed in a host device.

FIG. 14 illustrates a block diagram of an embodiment processing system 1400 for performing methods described herein, which may be installed in a host device. As shown, the processing system 1400 includes a processor 1404, a memory 1406, and interfaces 1410-1414, which may (or may not) be arranged as shown in FIG. 14. The processor 1404 may be any component or collection of components adapted to perform computations and/or other processing related tasks, and the memory 1406 may be any component or collection of components adapted to store programming and/or instructions for execution by the processor 1404. In an embodiment, the memory 1406 includes a non-transitory computer readable medium. The interfaces 1410, 1412, 1414 may be any component or collection of components that allow the processing system 1400 to communicate with other devices/components and/or a user. For example, one or more of the interfaces 1410, 1412, 1414 may be adapted to communicate data, control, or management messages from the processor 1404 to applications installed on the host device and/or a remote device. As another example, one or more of the interfaces 1410, 1412, 1414 may be adapted to allow a user or user device (e.g., personal computer (PC), etc.) to interact/communicate with the processing system 1400. The processing system 1400 may include additional components not depicted in FIG. 14, such as long term storage (e.g., non-volatile memory, etc.).

In some embodiments, the processing system 1400 is included in a network device that is accessing, or part otherwise of, a telecommunications network. In one example, the processing system 1400 is in a network-side device in a wireless or wireline telecommunications network, such as a base station, a relay station, a scheduler, a controller, a gateway, a router, an applications server, or any other device in the telecommunications network. In other embodiments, the processing system 1400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 15:
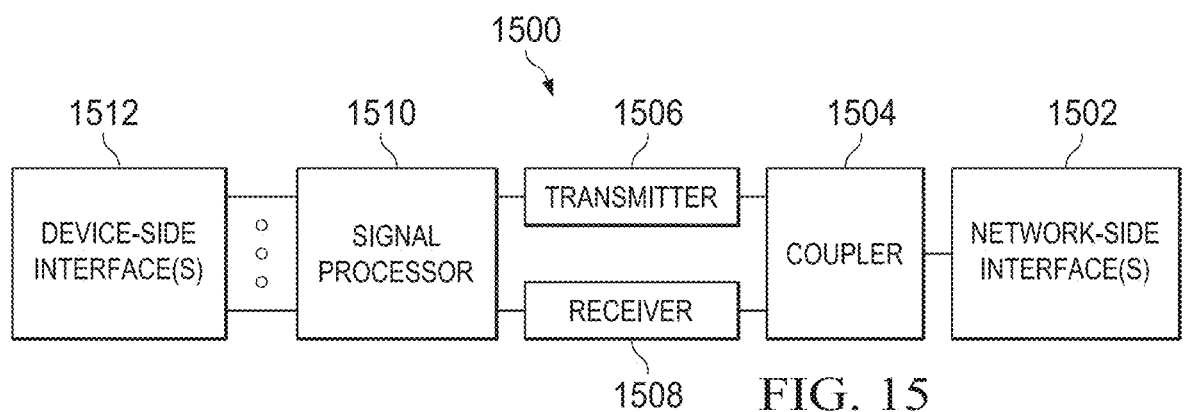
FIG. 15 illustrates a block diagram of a transceiver adapted to transmit and receive signaling over a telecommunications network.

In some embodiments, one or more of the interfaces 1410, 1412, 1414 connects the processing system 1400 to a transceiver adapted to transmit and receive signaling over the telecommunications network. FIG. 15 illustrates a block diagram of a transceiver 1500 adapted to transmit and receive signaling over a telecommunications network. The transceiver 1500 may be installed in a host device. As shown, the transceiver 1500 comprises a network-side interface 1502, a coupler 1504, a transmitter 1506, a receiver 1508, a signal processor 1510, and a device-side interface 1512. The network-side interface 1502 may include any component or collection of components adapted to transmit or receive signaling over a wireless or wireline telecommunications network. The coupler 1504 may include any component or collection of components adapted to facilitate bi-directional communication over the network-side interface 1502. The transmitter 1506 may include any component or collection of components (e.g., up-converter, power amplifier, etc.) adapted to convert a baseband signal into a modulated carrier signal suitable for transmission over the network-side interface 1502. The receiver 1508 may include any component or collection of components (e.g., down-converter, low noise amplifier, etc.) adapted to convert a carrier signal received over the network-side interface 1502 into a baseband signal. The signal processor 1510 may include any component or collection of components adapted to convert a baseband signal into a data signal suitable for communication over the device-side interface(s) 1512, or vice-versa. The device-side interface(s) 1512 may include any component or collection of components adapted to communicate data-signals between the signal processor 1510 and components within the host device (e.g., the processing system 1400, local area network (LAN) ports, etc.).

The transceiver 1500 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1502 comprises one or more antenna/radiating elements. For example, the network-side interface 1502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a method in a first communication node for providing contention-based transmission from the first communication node in a network to a second communication node includes determining, by the first communication node, a transmission direction, the transmission direction characterized by a digital beamforming direction and an analog beamsteering direction; performing, by the first communication node, spatial-specific carrier sensing in accordance with a sensing direction associated with the transmission direction; determining, by the first communication node, a channel status of a channel along the sensing direction according to the spatial-specific carrier sensing; and transmitting, by the first communication node, a transmission along the transmission direction. The transmission direction here may not necessarily be the line-of-sight direction between the first node and the second node. In an embodiment, the sensing direction is along the transmission direction or along a direction opposite of the transmission direction. In an embodiment the beamforming direction for both transmitting and receiving is generated by digital weights applied to the RF chains by the baseband. In an embodiment, the analog beamsteering direction, for both transmitting and receiving, is generated by phase shifters. In other words, the direction is associated with the "processing pattern" for digital beamforming and/or "receiving pattern" for analog beam steering. Performing spatial-specific carrier sensing in accordance with the transmission direction includes generating, by the first communication node, at least one of a spatial-specific receiving pattern and a spatial-specific processing pattern in accordance with the sensing direction; receiving, by the first communication node, a waveform signal from one or more third nodes in accordance with the spatial-specific receiving pattern; processing, by the first communication node, in accordance with the spatial-specific processing pattern; and generating, by the first communication node, a decision variable for determining the channel status of the channel along the sensing direction according to the waveform signal and the at least one of the spatial-specific receiving pattern and the spatial-specific processing pattern. In an embodiment, the waveform signal can be any signal sent by any other nodes. Such a signal may be seen as interference to the communications from the first node to the second node. In an embodiment, the waveform signal is a superposition of transmissions from the one or more third nodes. In an embodiment, when such a signal (interference) is strong, the first node may not want to transmit along that direction. In an embodiment, the channel status of the channel along the sensing direction is determined by comparing the decision variable against a decision threshold, wherein the channel is considered idle along the transmission direction when the decision variable is smaller than the decision threshold. In an embodiment, the decision threshold is determined based on at least one of the transmission power for the transmission, the frequency band (or subbands) for the transmission, and the transmission direction. The spatial-specific receiving pattern is associated with a receiver beam direction and is associated with a set of receiver phase shift values applied to the receiver analog phase shifters. In an embodiment, the spatial-specific processing pattern is a receiver combining vector/matrix associated with a precoding vector/matrix of the transmission direction applied in the digital domain. In an embodiment, the resource-specific receiving pattern and the resource-specific processing pattern are patterned such that a composite receiver combining a direction in a spatial domain is aligned with a composite beamforming direction plus a beamsteering of the transmission direction in the spatial domain. In an embodiment, the spatial-specific processing pattern is a receiver combining vector/matrix, wherein determining the receiver combining vector/matrix comprises obtaining a waveform received by the an analog components of the receive antennas in accordance with the spatial-specific receiving pattern; determining a plurality of combining vectors/matrices; generating a plurality of decision variables according to the plurality of combining vectors/matrices by applying the vectors/matrices to the waveform; and selecting one of the plurality of combining vectors/matrices as the receive combining vector/matrix according to a smallest one of the plurality of decision variable. In other words, when the baseband digital unit processes the received waveform, it may apply different digital combining vectors/matrices (e.g., $p_1$, $p_2$, $p_3$, . . . , where each $p_i$ is vector/matrix) to the waveform, generating different decision variables $X_1$, $X_2$, $X_3$, . . . . Then the digital combining vector/matrix associated with the smallest X is used, as that direction has the least amount of detected transmission activities. An optimization problem may be solved by the baseband to find the optimal direction among all possible directions. In an embodiment, performing spatial-specific carrier sensing in accordance with the sensing direction includes determining a receiver combining vector/matrix, wherein determining the receiver combining vector/matrix includes generating, by the first communication node, a spatial-specific receiving pattern and an initial spatial-specific processing pattern in accordance with the sensing direction; obtaining a waveform received by analog components of the receive antennas in accordance with the spatial-specific receiving pattern; determining a plurality of combining vectors/matrices associated with a plurality of spatial-specific processing patterns; generating a plurality of decision variables according to the plurality of combining vectors/matrices by applying the vectors/matrices to the waveform; and selecting one of the plurality of combining vectors/matrices as the receive combining vector/matrix according to a smallest one of the plurality of decision variables, wherein the selected receive combining vector/matrix defines the selected spatial-specific processing pattern, and the selected sensing direction is characterized by the spatial-specific receiving pattern and the selected spatial-specific processing pattern, and the channel status of the channel along the selected sensing direction is determined by the decision variable generated by the selected spatial-specific processing pattern; determining, by the first communication node, a new transmission direction associated with the selected sensing direction; and transmitting, by the first communication node, a transmission along the new transmission direction.

In an embodiment, a first communication node for providing contention-based transmission from the first communication node in a network to a second communication node includes a processor and a non-transitory computer readable storage medium storing programming for execution by the processor, the programming including instructions to: determine a transmission direction, the transmission direction characterized by a digital beamforming direction and an analog beamsteering direction; perform spatial-specific carrier sensing in accordance with the transmission direction; determine a channel status of a channel along the transmission direction according to the spatial-specific carrier sensing; and transmit a transmission along the transmission direction.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communications, the method comprising:

sensing, by a communication node on a first sensing beam, a first channel on a first set of frequency-domain resources;

determining, by the communication node, that the first channel is idle along a spatial direction of the first sensing beam; and performing, by the communication node, a first transmission over the first channel with a first transmit (TX) beam, wherein a spatial direction of the first TX beam is along the spatial direction of the first sensing beam.

2. The method of claim 1, wherein the first set of frequency-domain resources is one of a frequency band, a carrier, a plurality of carriers, a subband, a plurality of subbands, a subset of a set of frequency resources in the carrier, or a plurality of subsets of sets of frequency resources in one or more carriers.

3. The method of claim 1, wherein the determining that the first channel is idle along the spatial direction of the first sensing beam comprises:

determining that a decision variable is less than a decision threshold, the decision threshold being generated based on a transmission power for the first transmission, and the decision variable being generated based on a receiver output on the first sensing beam.

4. The method of claim 3, wherein the decision threshold is generated based on at least one parameter of the first set of frequency-domain resources.

5. The method of claim 3, wherein the decision variable indicates a receive (RX) energy level on the first channel on the first sensing beam.

6. The method of claim 1, the first sensing beam being generated based on a first resource-specific RX pattern and a first resource-specific processing pattern, the first resource-specific RX pattern being associated with a set of receiver phase shift values applied to receiver analog phase shifters of the communication node, the first resource-specific processing pattern being a first receiver combining vector associated with a first combining vector applied in the digital domain or being a first receiver combining matrix associated with a first combining matrix applied in the digital domain.

7. The method of claim 1, the first TX beam being generated based on a first resource-specific TX pattern and a first resource-specific precoding pattern, the first resource-specific TX pattern being associated with a set of transmitter phase shift values applied to transmitter analog phase shifters, the first resource-specific precoding pattern being a first transmitter precoding vector associated with a first precoding vector applied in the digital domain or being a first transmitter precoding matrix associated with a first precoding matrix applied in the digital domain.

8. The method of claim 7, comprising:

receiving, by the communication node from a network controller, a first resource-specific RX pattern indicating RX antennas, spatial RX parameters for the RX antennas, and the first set of frequency-domain resources for the sensing on the first sensing beam.

9. The method of claim 7, comprising:

receiving, by the communication node from a network controller, the first resource-specific TX pattern, the first resource-specific TX pattern indicating TX antennas, spatial TX parameters for the TX antennas, and the first set of frequency-domain resources for the first transmission on the first TX beam.

10. The method of claim 1, the first channel on the first set of frequency-domain resources being one of a plurality of channels on a plurality of sets of frequency-domain resources, the first sensing beam being one of a plurality of sensing beams, each one of the plurality of sensing beams corresponding to a different one of the plurality of channels, each one of the plurality of channels being on a different one of the plurality of sets of frequency-domain resources.

11. The method of claim 1, the first channel on the first set of frequency-domain resources being one of a plurality of channels on the first set of frequency-domain resources, the first sensing beam being one of a plurality of sensing beams, each one of the plurality of sensing beams corresponding to a different one of the plurality of channels.

12. The method of claim 11, comprising:

sensing, by the communication node, with the plurality of sensing beams, the first TX beam being one of a plurality of TX beams on which a plurality of transmissions are performed on the plurality of channels on the first set of frequency-domain resources, each one of the plurality of sensing beams corresponding to a different one of the plurality of TX beams.

13. The method of claim 12, the plurality of transmissions being a multiple-input multiple-output (MIMO) transmission with a transmission rank great than one or a multi-user (MU) MIMO transmission to more than one node.

14. The method of claim 12, a spatial direction of each one of the plurality of TX beams being along a spatial direction of a different one of a plurality of RX beams.

15. A communication node comprising:

at least one processor; and a non-transitory computer readable storage medium storing programming for execution by the at least one processor, the programming including instructions that cause the communication node to:

sense, on a first sensing beam, a first channel on a first set of frequency-domain resources;

determine that the first channel is idle along a spatial direction of the first sensing beam; and perform a first transmission over the first channel with a first transmit (TX) beam, a spatial direction of the first TX beam being along the spatial direction of the first sensing beam.

16. The communication node of claim 15, the first set of frequency-domain resources being one of a frequency band, a carrier, a plurality of carriers, a subband, a plurality of subbands, a subset of a set of frequency resources in the carrier, or a plurality of subsets of sets of frequency resources in one or more carriers.

17. The communication node of claim 15, the instructions further causing the communication node to:

determine that a decision variable is less than a decision threshold, the decision threshold being generated based on a transmission power for the first transmission, the decision variable being generated based on a receiver output on the first sensing beam.

18. The communication node of claim 17, the decision threshold being generated in accordance with at least a parameter of the first set of frequency-domain resources.

19. The communication node of claim 17, the decision variable indicating a receive (RX) energy level on the first channel on the first sensing beam.

20. The communication node of claim 15, the first sensing beam being generated based on a first resource-specific RX pattern and a first resource-specific processing pattern, the first resource-specific RX pattern being associated with a set of receiver phase shift values applied to receiver analog phase shifters, the first resource-specific processing pattern being a first receiver combining vector associated with a first combining vector applied in the digital domain or being a first receiver combining matrix associated with a first combining matrix applied in the digital domain.

\* \* \* \* \*

UNITED STATES PATENT AND TRADEMARK OFFICE
CERTIFICATE OF CORRECTION

| | |
|---|---|
| PATENT NO. | : 11,909,704 B2 |
| APPLICATION NO. | : 17/455787 |
| DATED | : February 20, 2024 |
| INVENTOR(S) | : Liu et al. |

It is certified that error appears in the above-identified patent and that said Letters Patent is hereby corrected as shown below:

In the Claims

In Column 24, in Claim 13, Line 22, delete "great" and insert -- greater --.

Signed and Sealed this
Thirtieth Day of April, 2024

*Katherine Kelly Vidal*

Katherine Kelly Vidal
*Director of the United States Patent and Trademark Office*